(12) United States Patent
Atsumi

(10) Patent No.: US 11,104,009 B2
(45) Date of Patent: Aug. 31, 2021

(54) MOVEMENT DEVICE PROVIDED WITH CYLINDRICAL ROTATING BODIES

(71) Applicant: ATSUMI REAL ESTATE & CORPORATION, INC., Tokyo (JP)

(72) Inventor: Kazuya Atsumi, Tokyo (JP)

(73) Assignee: ATSUMI REAL ESTATE & CORPORATION, INC., Tokyo (JP)

( * ) Notice: Subject to any disclaimer, the term of this patent is extended or adjusted under 35 U.S.C. 154(b) by 0 days.

(21) Appl. No.: 16/762,142

(22) PCT Filed: Nov. 6, 2018

(86) PCT No.: PCT/JP2018/041126
§ 371 (c)(1),
(2) Date: May 7, 2020

(87) PCT Pub. No.: WO2019/093303
PCT Pub. Date: May 16, 2019

(65) Prior Publication Data
US 2020/0361099 A1 Nov. 19, 2020

(30) Foreign Application Priority Data

Nov. 9, 2017 (JP) .............................. JP2017-216722

(51) Int. Cl.
B60K 1/02 (2006.01)
B25J 15/06 (2006.01)
(Continued)

(52) U.S. Cl.
CPC ............. B25J 15/06 (2013.01); B60K 7/0007 (2013.01); B60K 1/02 (2013.01); B60L 15/20 (2013.01);
(Continued)

(58) Field of Classification Search
CPC ................................. B25J 15/08; B60K 7/007
See application file for complete search history.

(56) References Cited

U.S. PATENT DOCUMENTS 4,383,401 A 5/1983 Lessard et al.
4,776,404 A 10/1988 Rogers et al.
(Continued)

FOREIGN PATENT DOCUMENTS

CN 2717632 Y 8/2005
JP H312713 U 2/1991
(Continued)

OTHER PUBLICATIONS

Office Action in CN Application No. 201880072670.0, dated Sep. 3, 2020, 11pp.
(Continued)

*Primary Examiner* — John D Walters
*Assistant Examiner* — James J Triggs
(74) *Attorney, Agent, or Firm* — Hauptman Ham, LLP

(57) ABSTRACT

To provide a moving apparatus including cylindrical rotating bodies each having a surface section that functions as a driving wheel or a working member. A moving apparatus includes three or more cylindrical rotating bodies, and a plurality of coupling members, each of which couples two of the cylindrical rotating bodies together such that an angle between the cylindrical rotating bodies is smaller than 180°, where each of the three or more cylindrical rotating bodies includes a motor, and an exterior body configured to be rotated by the motor, where the three or more cylindrical rotating bodies are configured to form a closed polygonal shape to hold an elongated member R including a rope, whereby the moving apparatus is movable along the elongated member.

9 Claims, 28 Drawing Sheets

(51) Int. Cl.
*B60K 7/00* (2006.01)
*B60L 15/20* (2006.01)

(52) U.S. Cl.
CPC ....... *B60L 2260/28* (2013.01); *B60Y 2200/91* (2013.01)

(56) References Cited

U.S. PATENT DOCUMENTS

| | | | | |
|---|---|---|---|---|
| 5,515,648 | A * | 5/1996 | Sparkes | A01G 31/047 47/65 |
| 6,840,007 | B2 * | 1/2005 | Leduc | A01G 31/047 47/62 C |
| 7,188,451 | B2 * | 3/2007 | Marchildon | A01G 31/047 47/59 R |
| 8,112,978 | B1 | 2/2012 | Dyal | |
| 10,111,394 | B2 * | 10/2018 | Roeser | A01G 31/047 |
| 10,299,442 | B2 * | 5/2019 | Vesty | A01G 9/26 |
| 10,337,246 | B1 * | 7/2019 | Wise | B62B 5/067 |
| 10,351,156 | B1 * | 7/2019 | Pilgrim | B62B 5/0083 |
| 2002/0002068 | A1 * | 1/2002 | Welch | A01F 12/20 460/71 |
| 2014/0246261 | A1 | 9/2014 | Sekine et al. | |
| 2014/0366502 | A1 | 12/2014 | Miller | |
| 2018/0279564 | A1 * | 10/2018 | McKellar | A01D 46/02 |
| 2019/0072066 | A1 * | 3/2019 | Oh | F03B 11/006 |
| 2020/0361099 | A1 * | 11/2020 | Atsumi | B60K 7/0007 |

FOREIGN PATENT DOCUMENTS

| | | |
|---|---|---|
| JP | H534820 U | 5/1993 |
| JP | H10110893 A | 4/1998 |
| JP | 2002264066 A | 9/2002 |
| JP | 20041931 A | 1/2004 |
| JP | 20057914 A | 1/2005 |
| JP | 3117330 U | 1/2006 |
| JP | 200625957 A | 2/2006 |
| JP | 2008184837 A | 8/2008 |
| JP | 2009289179 A | 12/2009 |
| JP | 2011120390 A | 6/2011 |
| JP | 201386545 A | 5/2013 |
| JP | 201595987 A | 5/2015 |
| WO | 2017154254 A1 | 9/2017 |

OTHER PUBLICATIONS

International Search Report in PCT Application No. PCT/JP2018/041126, dated Feb. 12, 2019, 4pp.
International Preliminary Report on Patentability in PCT Application No. PCT/JP2018/041126, dated Jan. 21, 2020, 23pp.

* cited by examiner

[Fig.1]
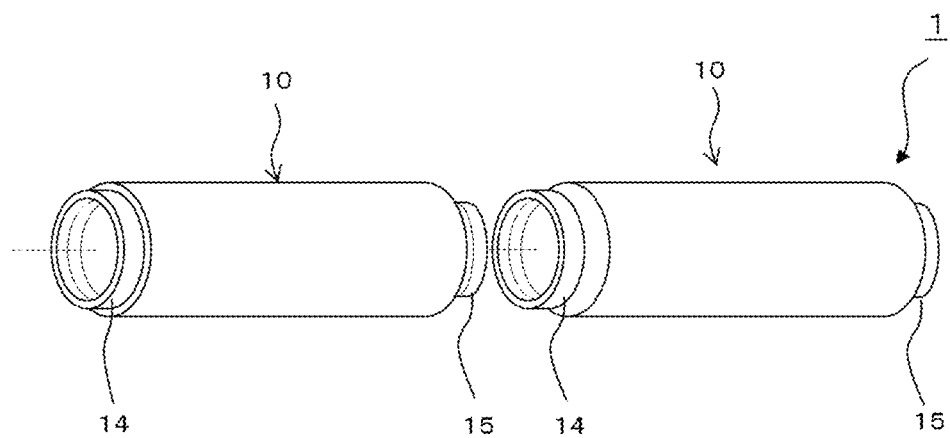

[Fig.3]
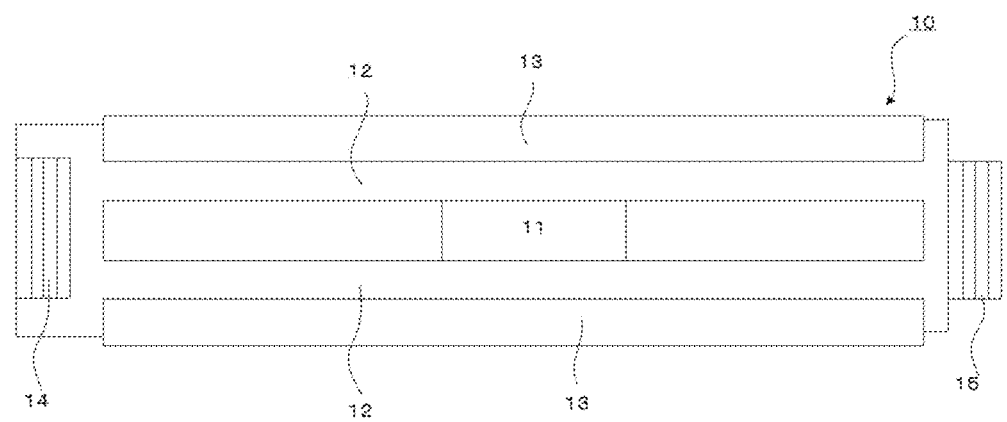

Fig. 5A
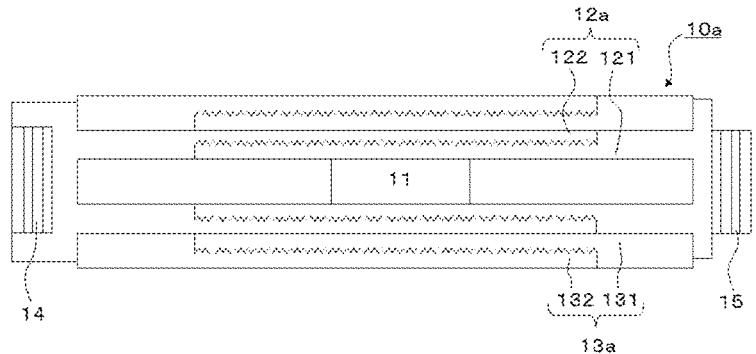
Fig. 5B
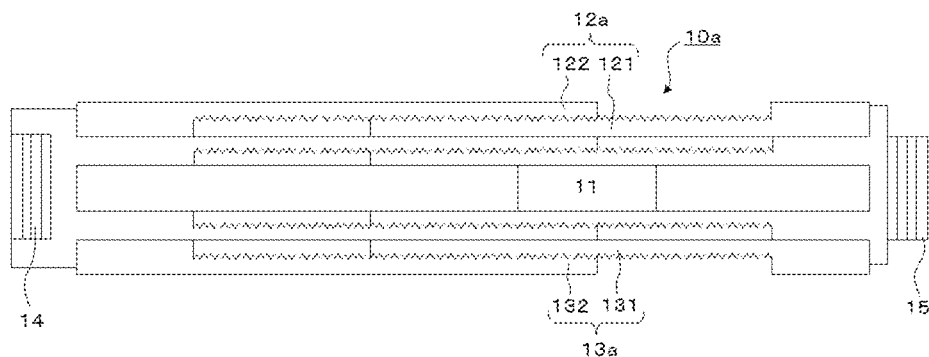
[Fig.6]
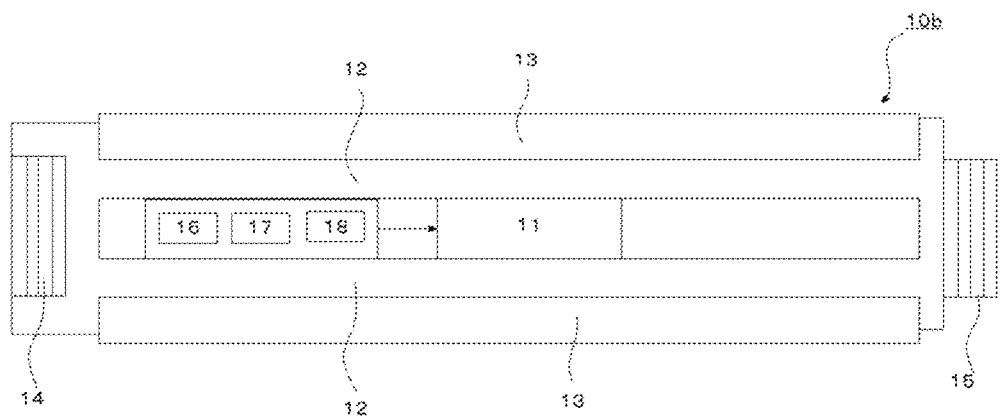

[Fig.7]
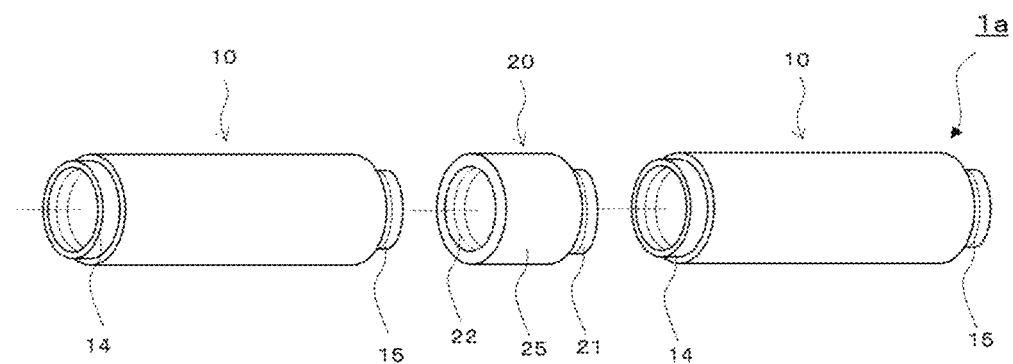
[Fig.8]
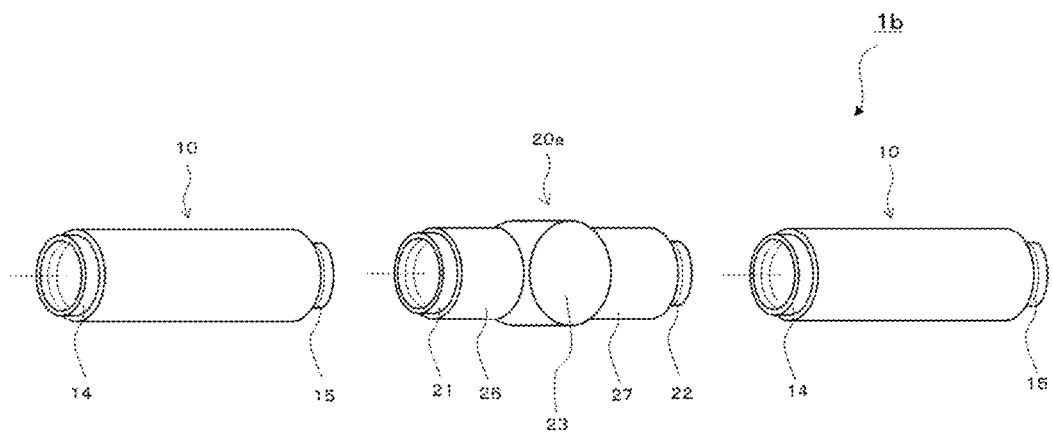

[Fig.9]
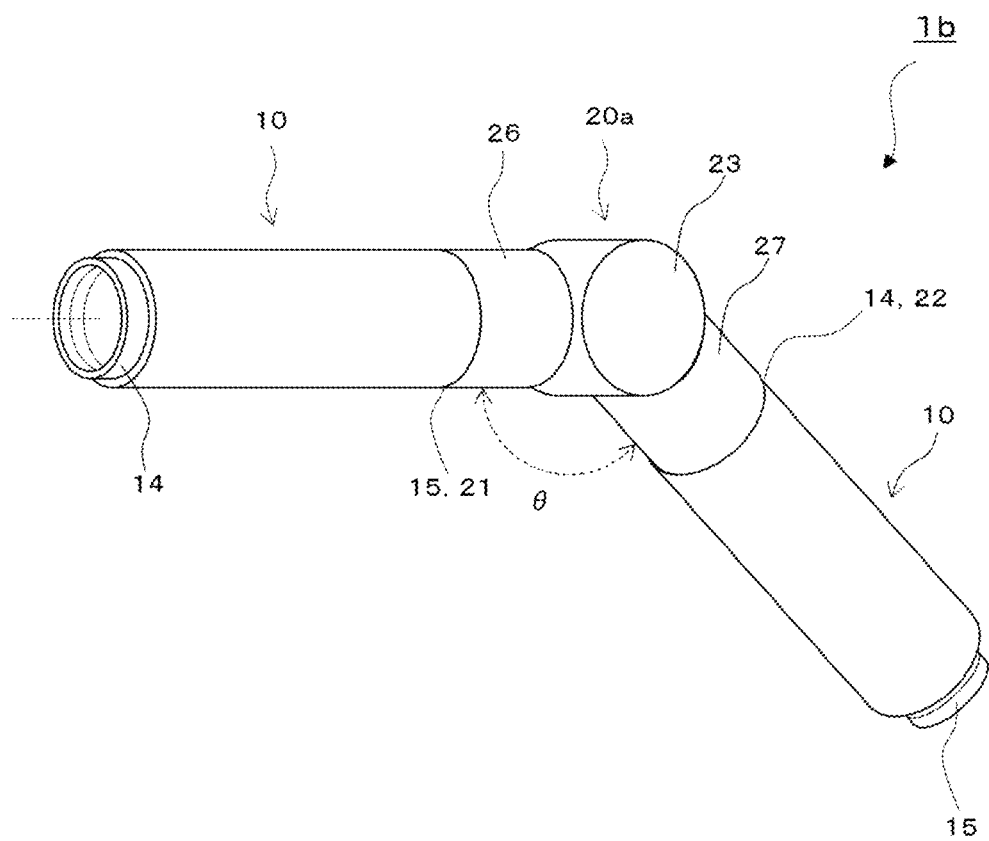

[Fig.12]
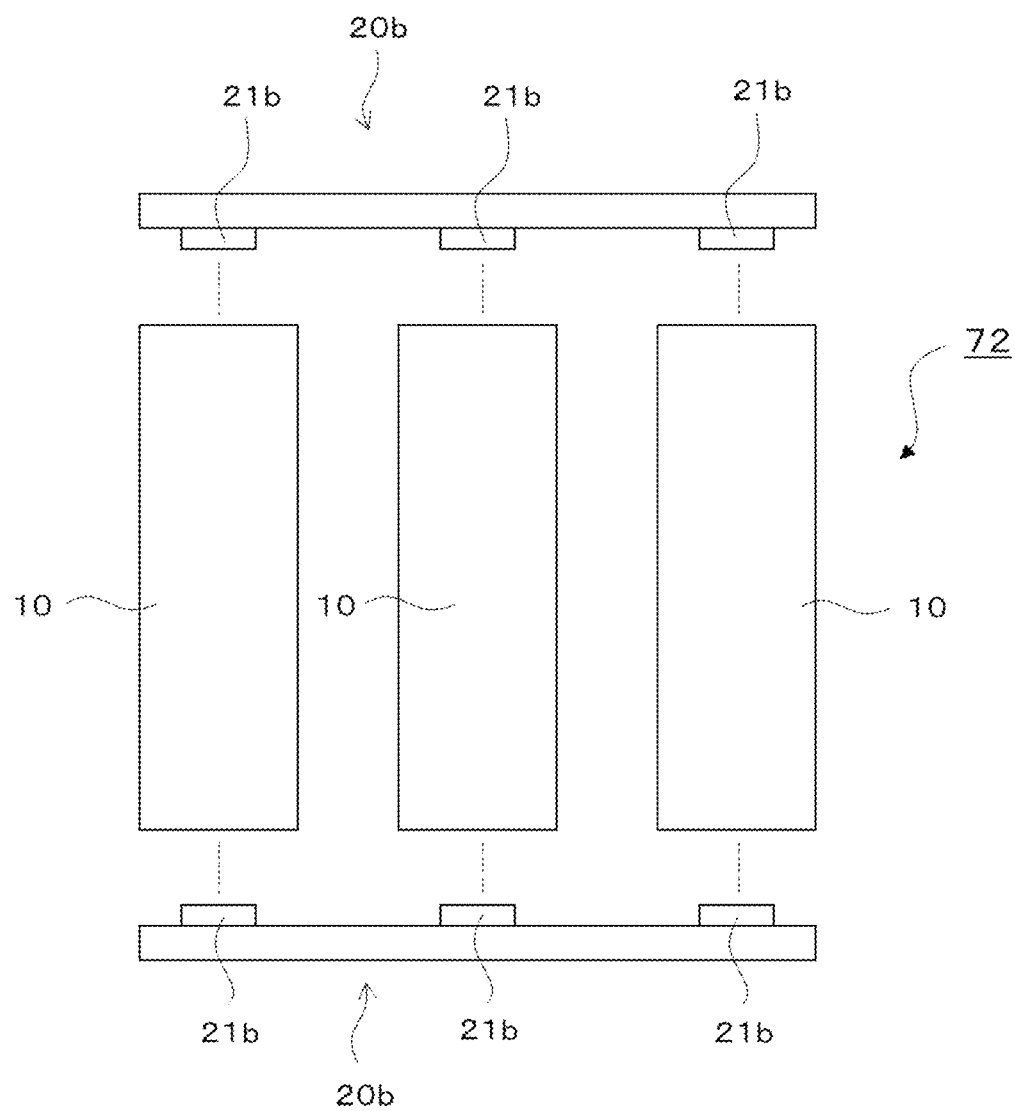

[Fig.13a]
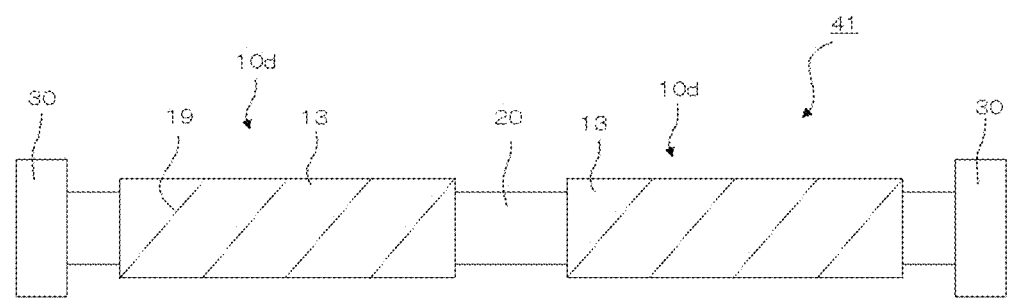

Fig. 13b-A
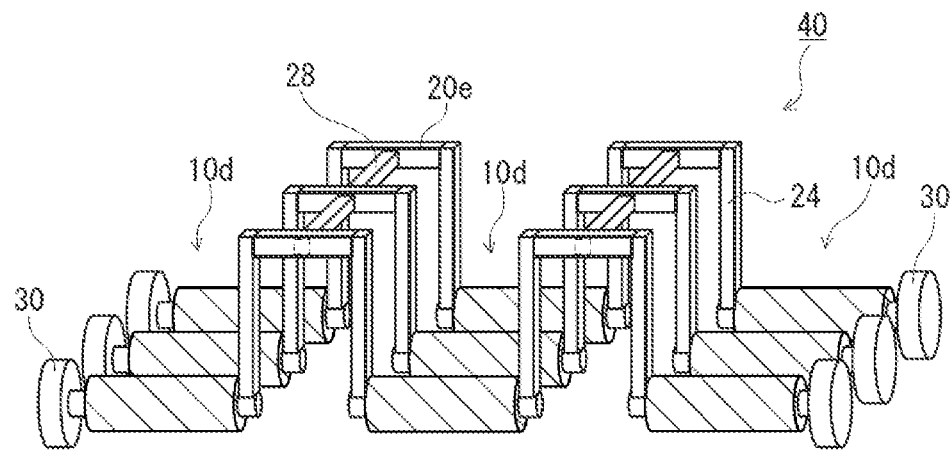
Fig. 13b-B
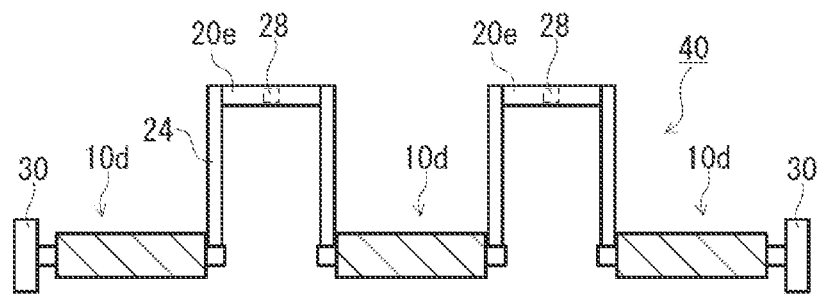
Fig. 13b-C
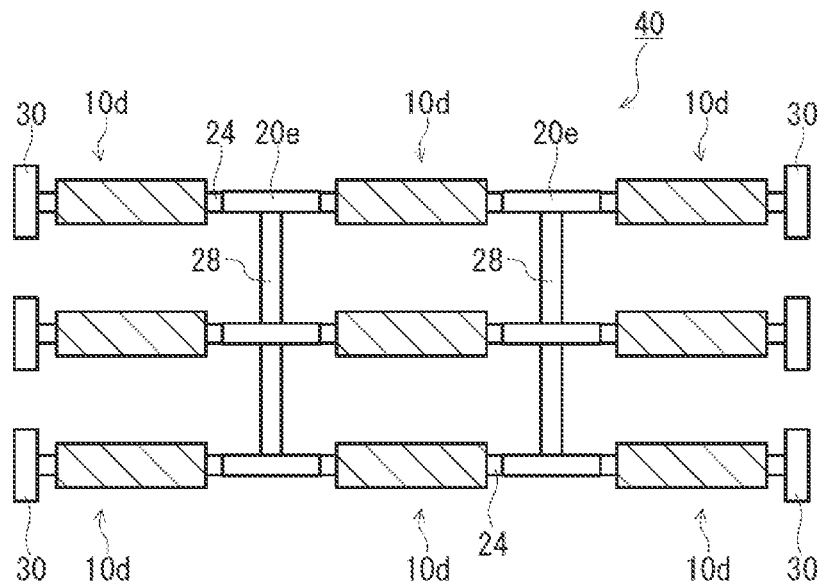

[Fig.14]
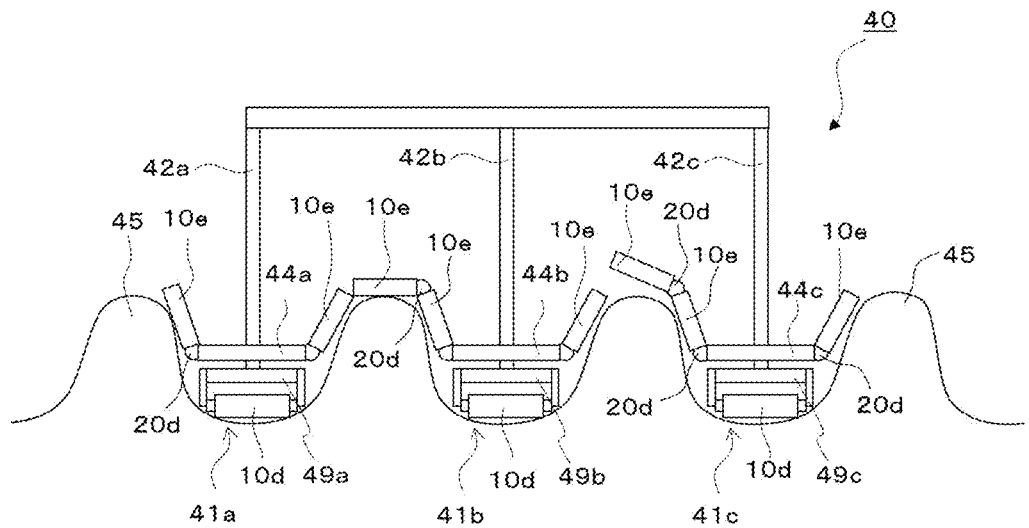
[Fig.15]
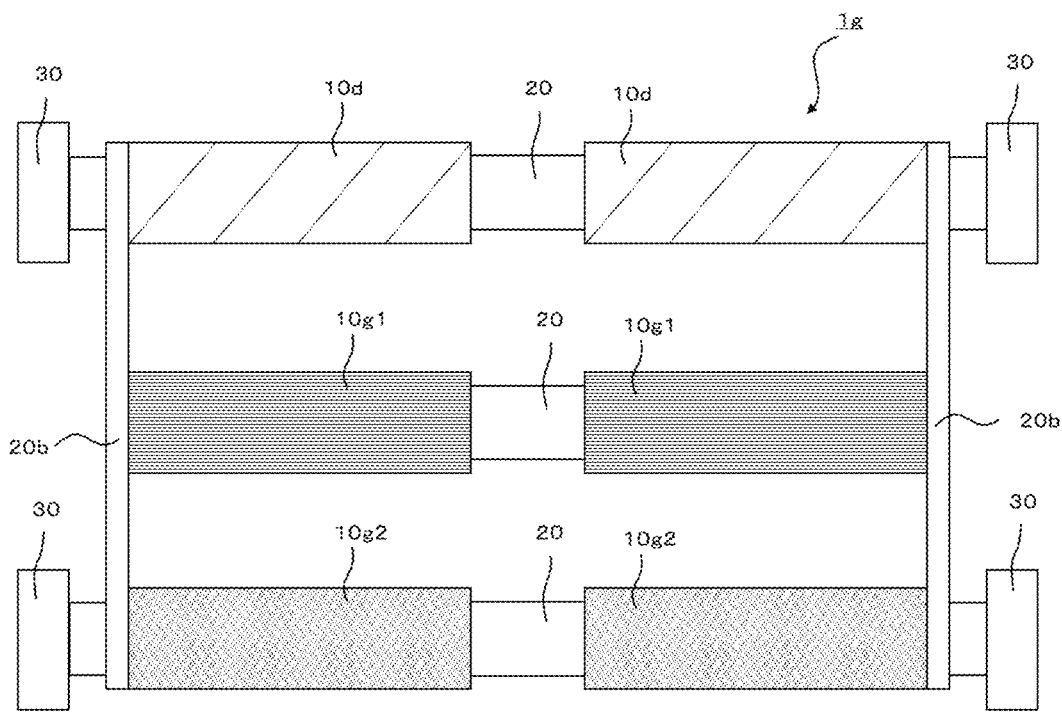

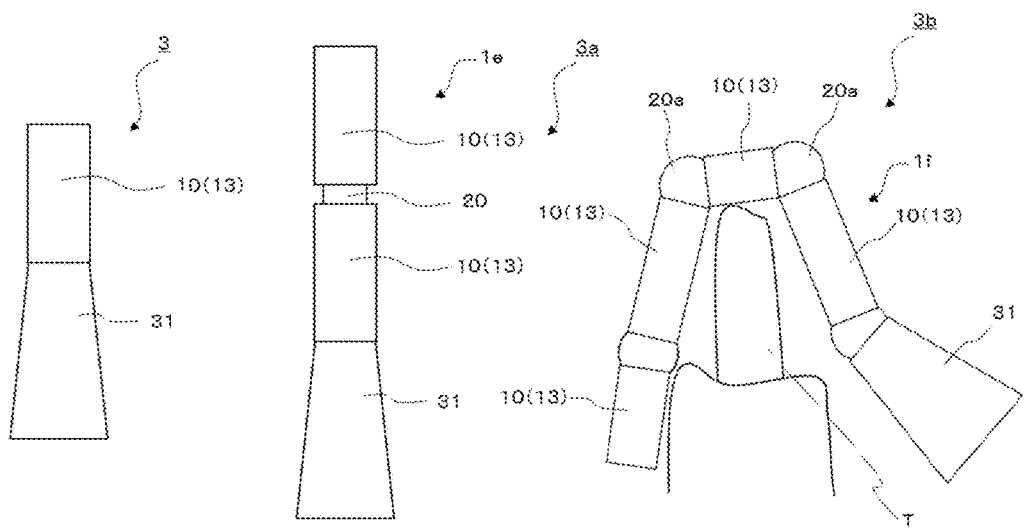
Fig. 16A　　Fig. 16B　　Fig. 16C
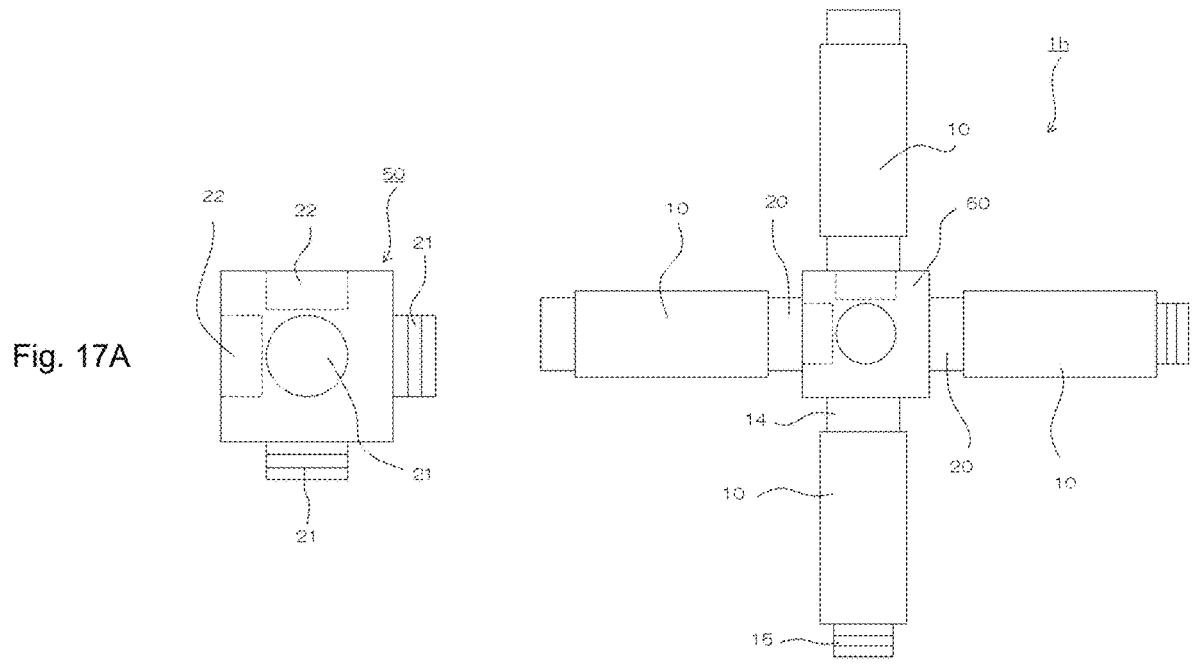
Fig. 17A
Fig. 17B

[Fig.19]
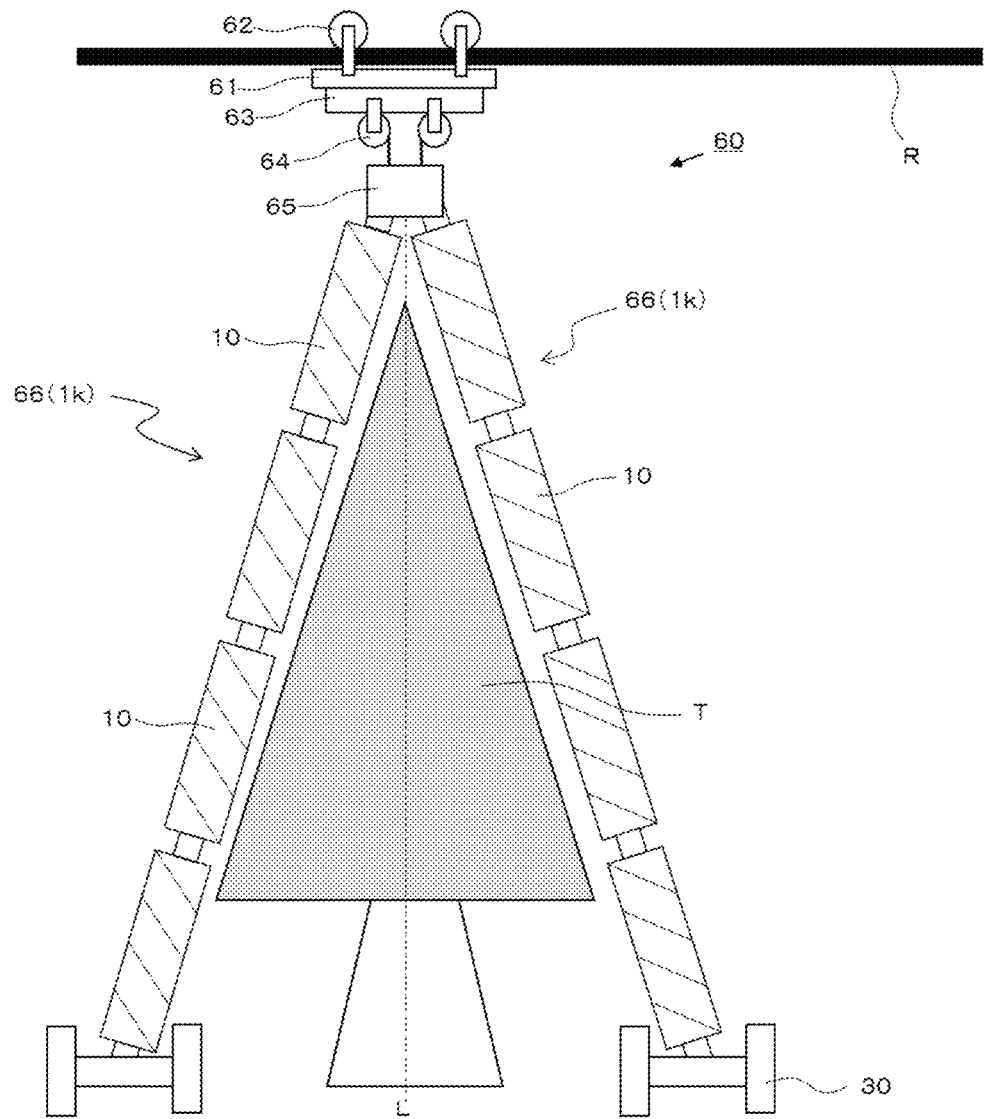

[Fig.22]
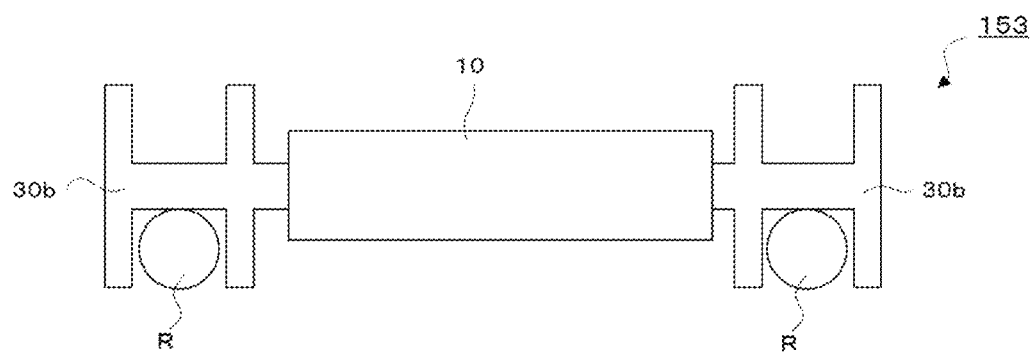

[Fig.23]
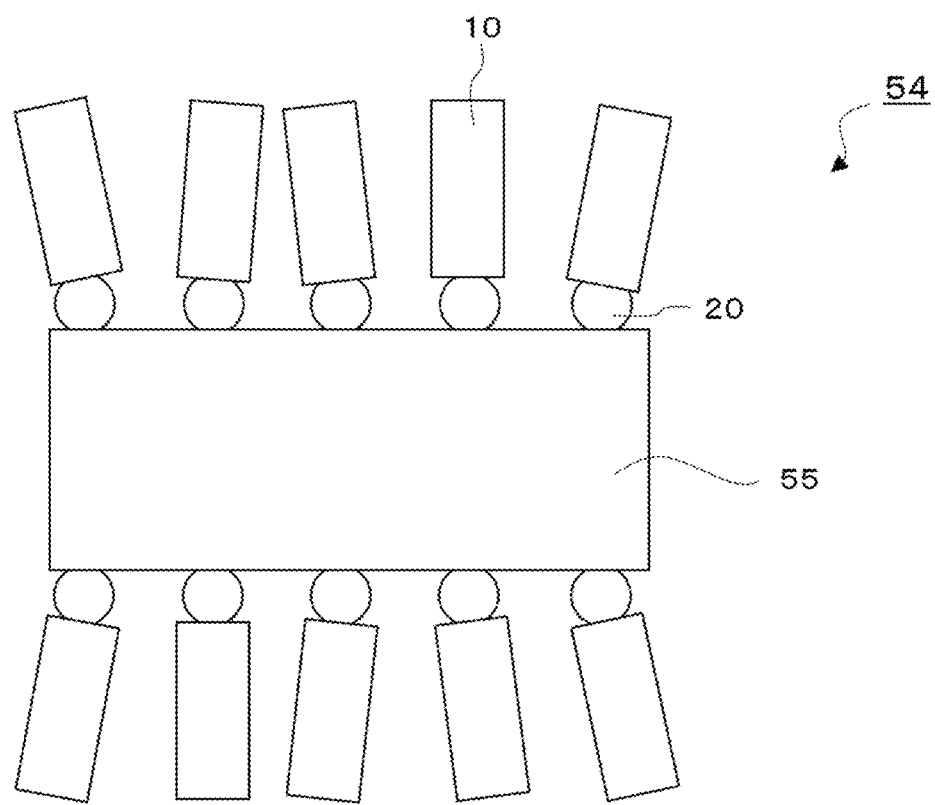

[Fig.27]
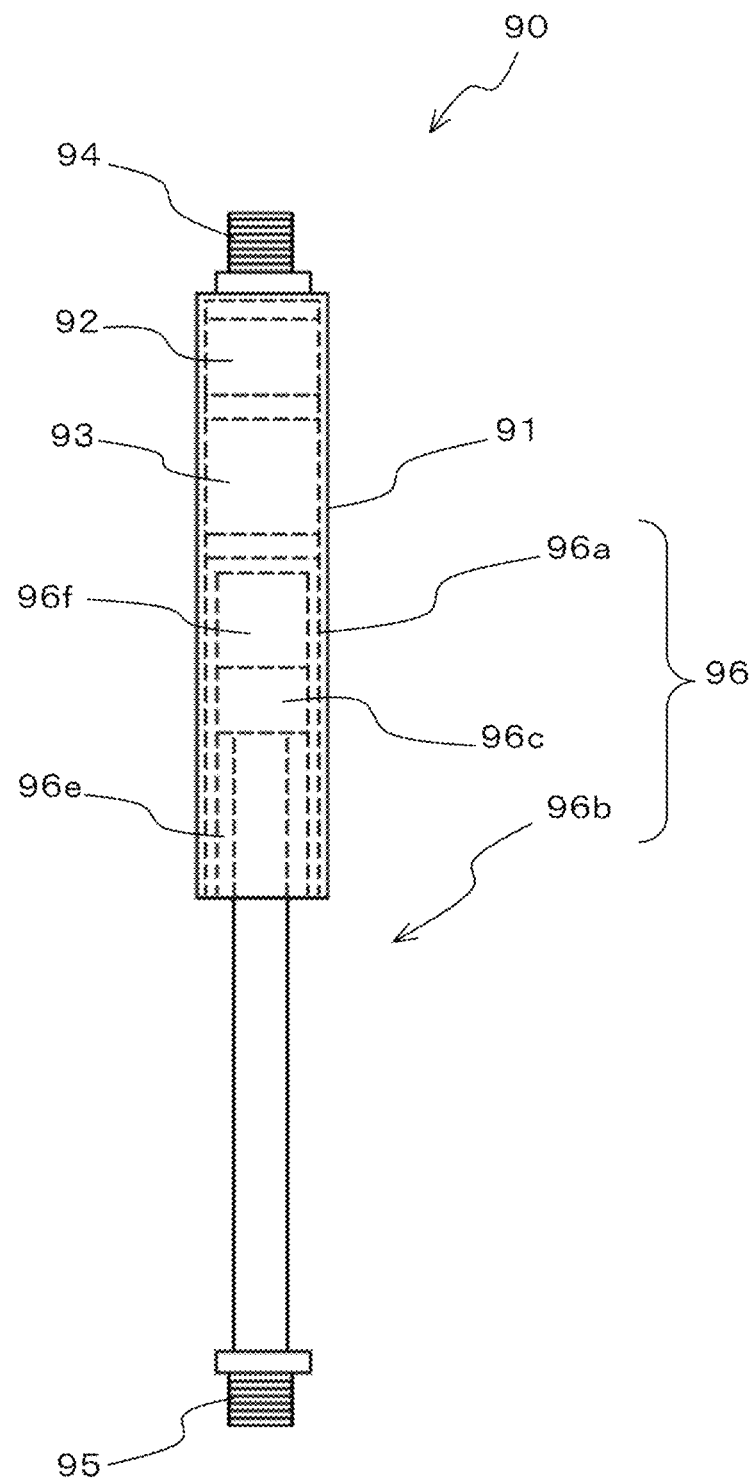

[Fig.28]
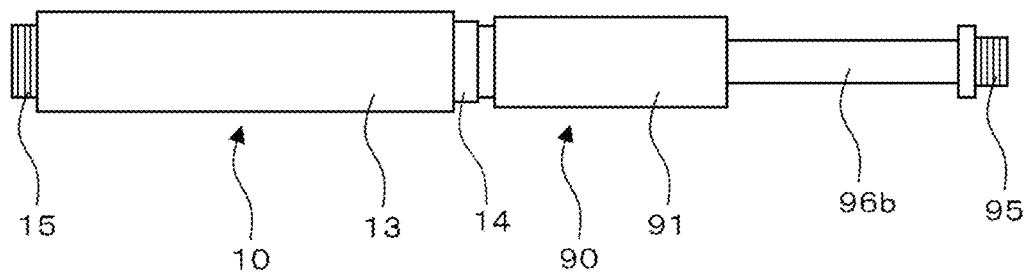
[Fig.29]
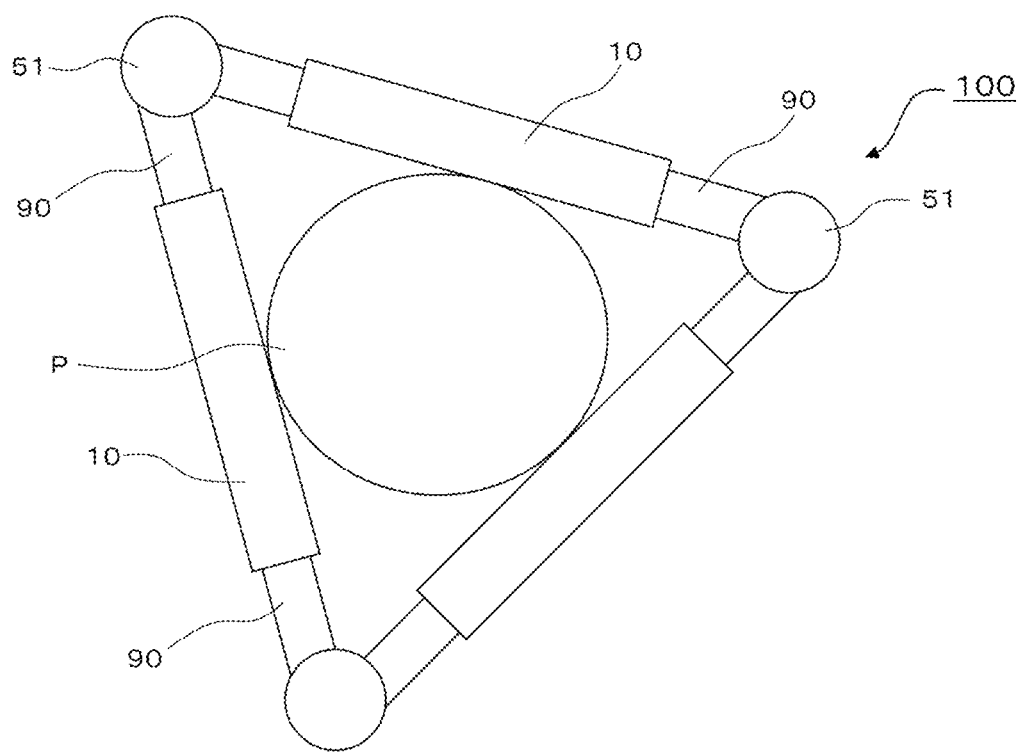

[Fig.30]
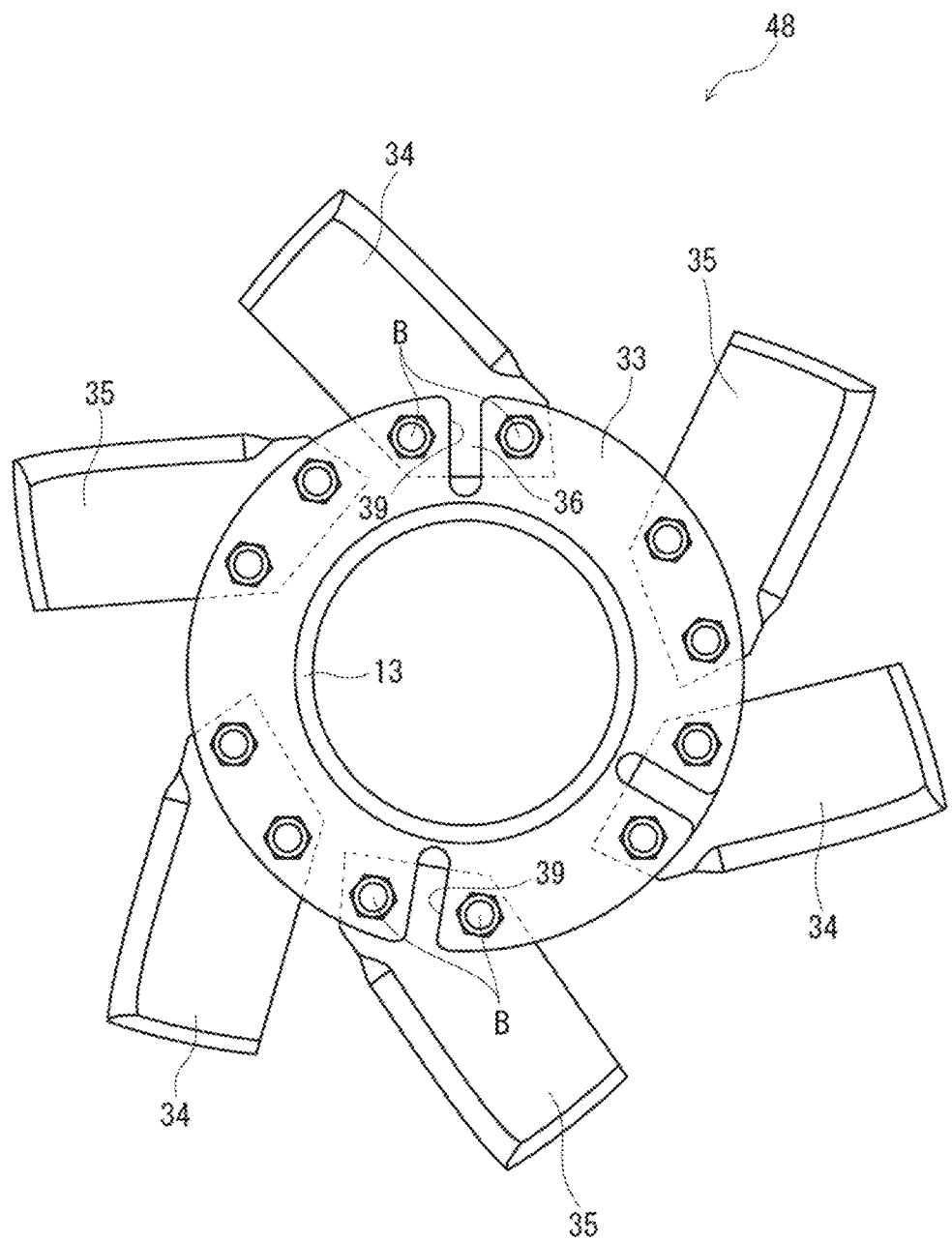

[Fig.31]
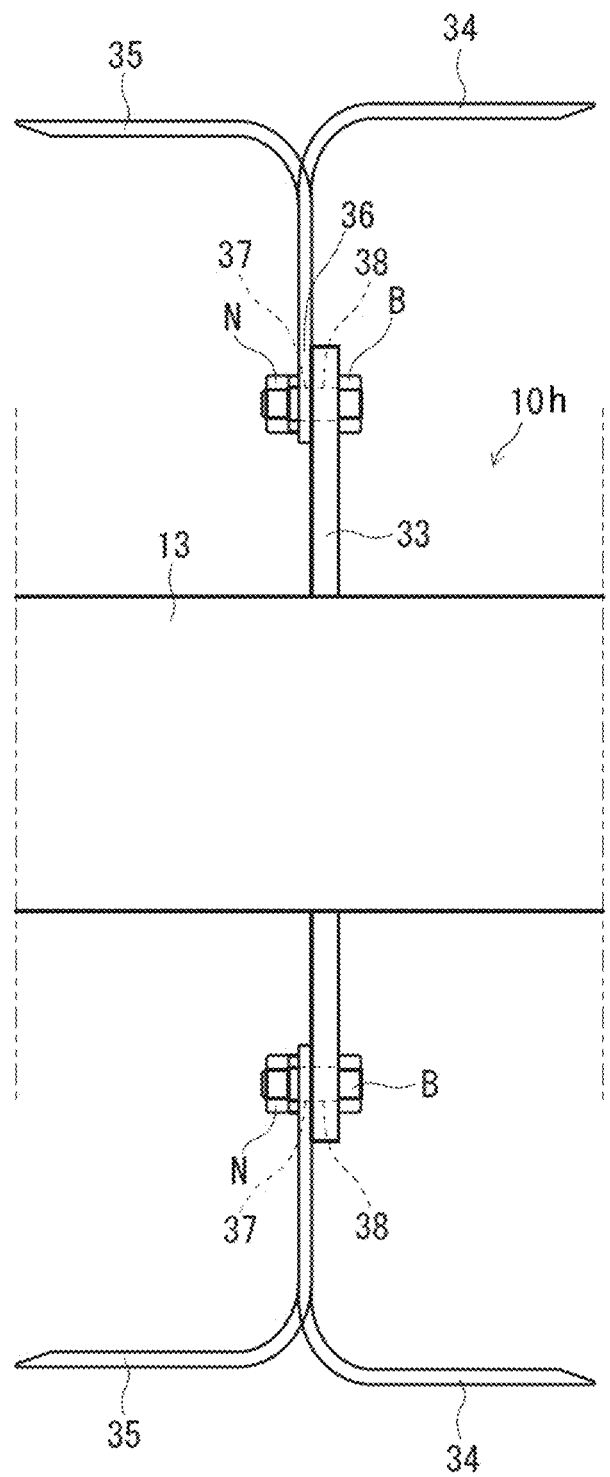

[Fig.33]
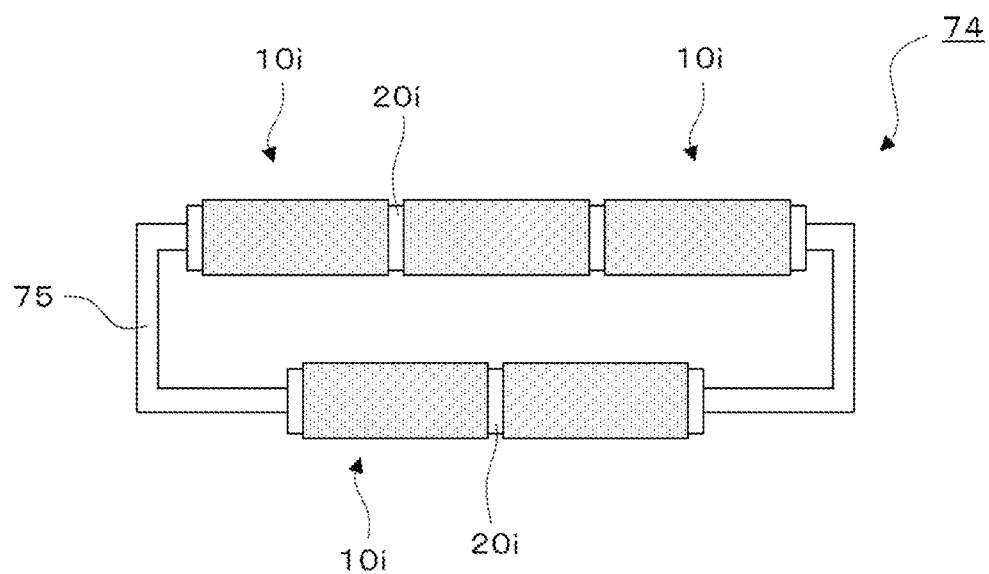
[Fig.34]
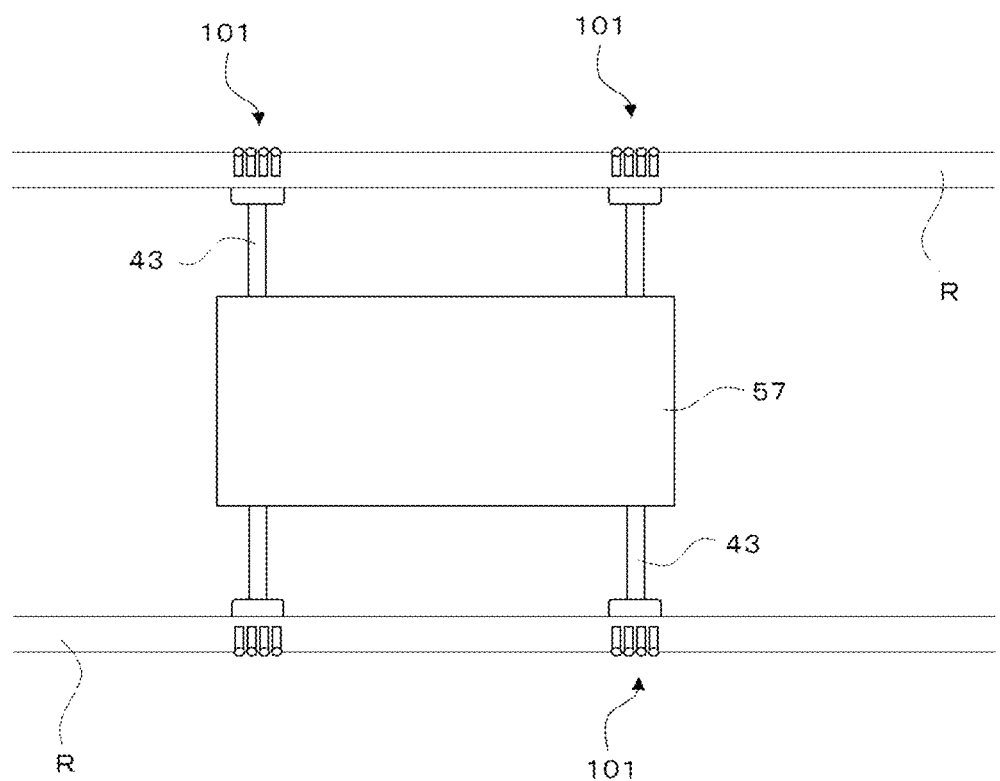

MOVEMENT DEVICE PROVIDED WITH CYLINDRICAL ROTATING BODIES

RELATED APPLICATIONS

The present application is a National Phase of International Application No. PCT/JP2018/041126, filed Nov. 6, 2018, and claims priority based on Japanese Patent Application No. 2017-216722, filed Nov. 9, 2017.

TECHNICAL FIELD

The present invention relates to a moving apparatus including cylindrical rotating bodies (for example, an agricultural vehicle, a toy car, a carriage, and a robot hand having cylindrical rotating bodies).

BACKGROUND ART

Conventionally, a complex traveling body having a plurality of rotating bodies coupled together has been known (for example, see Patent Literature 1).

CITATION LIST

Patent Literatures

[Patent Literature 2] Japanese Patent Laid-Open Publication No. 2015-95987

SUMMARY

Technical Problem

In conventional techniques, there has been no apparatus including a cylindrical rotating body having a surface section that functions as a driving wheel or a working member.

An object of the present invention is to provide an apparatus including cylindrical rotating bodies that can solve the above-described problem.

Solution to Problem

A moving apparatus according to the present invention includes three or more cylindrical rotating bodies, and a plurality of coupling members each of which couples two of the cylindrical rotating bodies together such that an angle between the cylindrical rotating bodies is smaller than 180°, where each of the three or more cylindrical rotating bodies includes a motor, and an exterior body configured to be rotated by the motor, where the three or more cylindrical rotating bodies are configured to form a closed polygonal shape to hold an elongated member, including a rope, whereby the moving apparatus is movable along the elongated member.

The moving apparatus may include a storage section configured to store a control program, and a controller configured to control a rotation number of the exterior body based on the control program, where a rotation number of each of the exterior bodies of the plurality of cylindrical rotating bodies may be controllable.

In the moving apparatus, the controller may be configured to cause the cylindrical rotating bodies to strongly grip the elongated member to apply a brake.

In the moving apparatus, the cylindrical rotating body may include an extendable mechanism that allows the cylindrical rotating body to extend and contract in a longitudinal direction.

In the moving apparatus, the exterior body may include first and second exterior bodies each with a helicoid that are disposed in a nested manner, and a motor for extension and contraction of the first and the second exterior bodies, and the exterior body may be automatically extendable and contractable in the longitudinal direction by the motor for extension and contraction.

The moving apparatus may include a locking mechanism configured to lock the polygonal shape.

The moving apparatus may be configured to go up and down along the elongated member obliquely upward or vertically.

A robot hand according to the present invention includes a plurality of fingers constituted by the moving apparatuses described above.

In the robot hand, the finger may include a fore end to which a tool, a cooking device, or an electric machine is attachable.

A moving apparatus according to a second aspect of the present invention includes a main body, cylindrical rotating bodies disposed below the main body, and a control unit configured to control driving of the cylindrical rotating bodies, where each of two or more of the cylindrical rotating bodies includes a motor, and an exterior body configured to be rotated by the motor, and the exterior bodies or members disposed on surfaces of the exterior bodies contact a ground.

The moving apparatus according to the second aspect may include four or more of the cylindrical rotating bodies, where the cylindrical rotating bodies may be arranged at regular intervals in a matrix.

The moving apparatus according to the second aspect may include three or more of the cylindrical rotating bodies, where the cylindrical rotating bodies may be arranged in a zigzag manner.

The moving apparatus according to the second aspect may include an extendable cylindrical body directly or indirectly coupled to the cylindrical rotating body, where a distance between the cylindrical rotating body and the main body may be adjustable by the extendable cylindrical body.

The moving apparatus according to the second aspect may be sized to be usable as a toy car.

In the moving apparatus according to the second aspect, a blade may be disposed on a surface of the exterior body, and the moving apparatus may be capable of mowing, pruning, logging, tilling, or snow removal using the cylindrical rotating body.

In the moving apparatus according to the second aspect, a brush may be disposed on a surface of the exterior body, and the moving apparatus may be capable of cleaning using the cylindrical rotating body.

In the moving apparatus according to the second aspect, the cylindrical rotating bodies may function as driving wheels.

The moving apparatus according to the second aspect may further include a plurality of wheels that function as driving wheels, where the vehicle allows for self-traveling.

In the moving apparatus according to the second aspect, at least one of the two or more cylindrical rotating bodies may have a storage chamber configured to store seeds, and an openable discharge port for sowing the seeds.

In the moving apparatus according to the second aspect, at least one of the two or more cylindrical rotating bodies may have a discharge port for spraying water, disinfectant, herbicide, fertilizer, or agrochemicals.

The moving apparatus according to the second aspect may include a rack section on which a load is placed.

A moving apparatus according to a third aspect of the present invention includes a main body, an opening adjustment unit disposed below the main body, two rotation aggregates coupled to the opening adjustment unit at an adjustable opening-closing angle, and wheels disposed below the rotation aggregates, where the rotation aggregates each have a plurality of serially connected cylindrical rotating bodies, and the cylindrical rotating bodies each include a motor, an exterior body configured to be rotated by the motor, and a pruning blade disposed on an outer periphery of the exterior body.

In the moving apparatus according to the third aspect, the main body and the opening adjustment unit may be coupled together via a rotary board, and the rotary board may allow for rotation of the opening adjustment unit.

In the moving apparatus according to the third aspect, the rotary board and the opening adjustment unit may be coupled together via a height adjustment unit, and the height adjustment unit may allow for adjustment of a height of the opening adjustment unit.

A working apparatus according to the present invention includes a cylindrical rotating body, and a base section coupled to the cylindrical rotating body, where the cylindrical rotating body includes a motor, and an exterior body configured to be rotated by the motor, where the base section is wearable on or holdable by a fingertip.

In the working apparatus, a brush may be disposed on a surface of the exterior body, whereby the working apparatus may be capable of brushing in an oral cavity by the cylindrical rotating body.

In the working apparatus, the cylindrical rotating body may be made up of three or more cylindrical rotating bodies, the working apparatus further including a plurality of coupling members each of which couples two of the cylindrical rotating bodies together such that an angle between the cylindrical rotating bodies is smaller than 180°.

Advantageous Effects of Invention

According to the present invention, it is possible to provide an apparatus including cylindrical rotating bodies each having a surface section that functions as a driving wheel or a working member.

BRIEF DESCRIPTION OF DRAWINGS

FIG. 1 is a perspective view showing an example of a rotating body aggregate according to a first embodiment;

FIG. 2A is a side view showing the cylindrical rotating bodies before being coupled together, FIG. 2B is a side view showing the cylindrical rotating bodies that are coupled together to rotate, and FIG. 2C is a side view showing a variation of the cylindrical rotating bodies that are coupled together to rotate;

FIG. 3 is a block diagram showing a configuration of the cylindrical rotating body according to the present embodiment;

FIG. 4A is a side view showing a carriage including four of the cylindrical rotating bodies as wheels, FIG. 4B a side view showing a carriage including four of the cylindrical rotating bodies as wheels, and FIG. 4C is a side view showing a carriage including rotary boards each with the cylindrical rotating bodies attached to a bottom surface thereof;

FIGS. 5A and 5B illustrate block diagrams showing a configuration of a cylindrical rotating body according to a second embodiment, where FIG. 5A shows a contracted state and FIG. 5B shows an extended state;

FIG. 6 is a block diagram showing a configuration of a cylindrical rotating body according to a third embodiment;

FIG. 7 is a perspective view showing an example of a rotating body aggregate according to a fourth embodiment;

FIG. 8 is a perspective view showing an example of a rotating body aggregate according to a fifth embodiment;

FIG. 9 is a perspective view showing an example of the rotating body aggregate according to the fifth embodiment;

FIG. 10A is a side view showing a carrier apparatus including three cylindrical rotating bodies, and FIG. 10B is a side view showing a carrier apparatus including seven cylindrical rotating bodies;

FIG. 11A is a plan view, FIG. 11B is a side view showing a holding state, and FIG. 11C is a side view of a variation in which a blade is attached;

FIG. 12 is a diagram showing a moving apparatus including a rotating body aggregate according to a seventh embodiment;

FIG. 13a is a diagram showing a moving apparatus including a rotating body aggregate according to an eighth embodiment and is also a side view showing a mowing mechanism made up of two cylindrical rotating bodies;

FIGS. 13b-A to 13b-C illustrate views showing a moving apparatus including the rotating body aggregate according to the eighth embodiment, where FIG. 13b-A is a perspective view showing a mowing apparatus including mowing mechanisms each made up of three cylindrical rotating bodies, FIG. 13-B is a side view, and FIG. 13-C is a plan view;

FIG. 14 is a view showing another example of an agricultural vehicle (agricultural equipment) including the rotating body aggregate according to the eighth embodiment;

FIG. 15 is a view showing an example of an agricultural vehicle (agricultural equipment) including a rotating body aggregate according to a ninth embodiment;

FIGS. 16A to 16C illustrate diagrams showing examples of a working apparatus (fingerstall) including a cylindrical rotating body or a rotating body aggregate according to a tenth embodiment, where FIG. 16A is a configuration example including the single cylindrical rotating body, FIG. 16B is a configuration example including the rotation aggregate; and FIG. 16C is a configuration example including bending sections;

FIG. 17A illustrates a view showing an example of a coupling member and a rotating body aggregate according to an eleventh embodiment;

FIG. 17B illustrates a view showing an example of a coupling member and a rotating body aggregate according to an eleventh embodiment;

FIG. 19 is a view showing a moving apparatus including rotating body aggregates according to a twelfth embodiment;

FIG. 20A is a front view of a first carriage including the cylindrical rotating body below a rack section, and FIG. 20B is a front view of a second carriage including the cylindrical rotating body below the rack section;

FIG. 21A is a first variation, FIG. 21B is a second variation, FIG. 21C is a third variation, and FIG. 21D is a fourth variation;

FIG. 22 is a side view of a moving apparatus including a cylindrical rotating body according to a fourteenth embodiment;

FIG. 23 is a plan view of a moving apparatus including cylindrical rotating bodies according to a fifteenth embodiment;

FIG. 27 is a side view of an extendable cylindrical body to be connected to a rotating body aggregate according to the second embodiment;

FIG. 28 is a side view of a cylindrical rotating body connected to the extendable cylindrical body in FIG. 27;

FIG. 29 is a plan view of a lifting apparatus including rotation aggregates with the extendable cylindrical bodies connected to both ends thereof;

FIG. 30 is a side view showing a tilling mechanism formed by attaching tilling claws to the cylindrical rotating body;

FIG. 31 is a plan view showing a relevant part of the tilling mechanism in FIG. 30;

FIG. 32A is a side view of the cylindrical rotating bodies coupled together, and FIG. 32B is a side view of a coupling tool;

FIG. 33 is a bottom view showing a configuration example in the case where the cylindrical rotating bodies are utilized as a road roller; and FIG. 34 is a view for explaining a moving apparatus including cylindrical rotating bodies according to a variation of the sixth embodiment.

DESCRIPTION OF EMBODIMENTS

Hereinafter, a cylindrical rotating body, a rotating body aggregate, and a moving apparatus (also referred to as an agricultural vehicle, a toy car, a carriage, a working apparatus, and a robot hand) having the cylindrical rotating body according to the present invention will be described with reference to the drawings.

First Embodiment

Figure 2A:
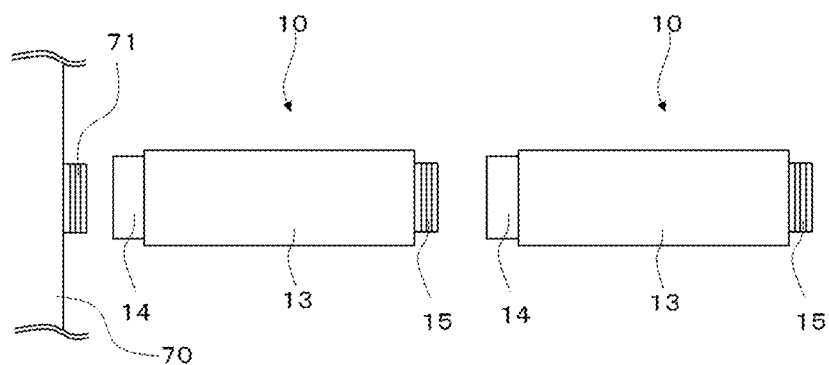
FIGS. 2A to 2C illustrate views for explaining coupling and a rotating motion of cylindrical rotating bodies, where
Figure 2B:
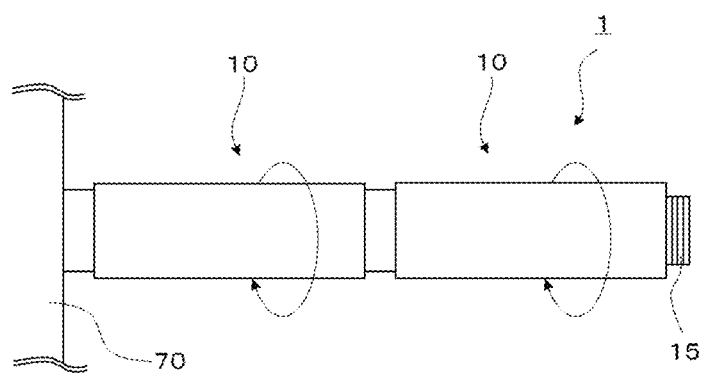
Figure 2C:
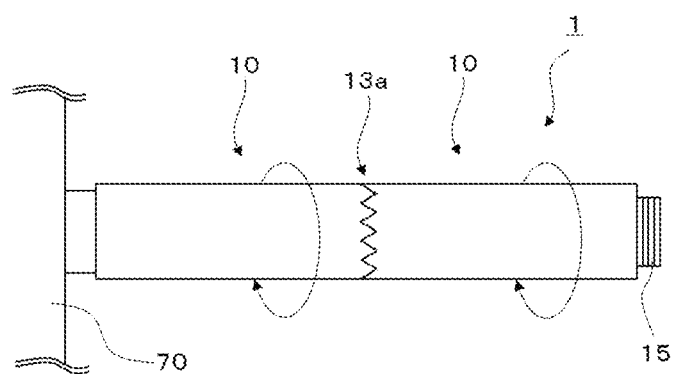

FIG. 1 is a perspective view of a rotating body aggregate 1 according to a first embodiment. FIGS. 2A to 2C illustrate views for explaining coupling and a rotating motion of cylindrical rotating bodies 10. FIG. 3 is a block diagram showing a configuration of the cylindrical rotating body 10 according to the first embodiment.

As shown in FIG. 1, the rotating body aggregate 1 according to the first embodiment is constituted by coupling a plurality of the cylindrical rotating bodies 10 together. Specifically, as shown in FIGS. 1 and 2, the rotating body aggregate 1 is constituted by coupling a first coupling section 14 of the cylindrical rotating body 10 to a second coupling section 15 of the other cylindrical rotating body 10. In the present embodiment, an inner surface of the first coupling section 14 that is recessed and an outer surface of the second coupling section 15 that is protruded have spiral grooves (helicoids), which allows the first coupling section 14 of the cylindrical rotating body 10 to be screwed onto the second coupling section 15 of the other cylindrical rotating body 10 for coupling together. The first coupling section 14 and the second coupling section 15 are not limited to the spiral grooves (helicoids), and may have any structure that allows for mutual engagement of the first coupling section 14 and the second coupling section 15. For example, the first coupling section 14 and the second coupling section 15 may be male and female attachments (coupling joints).

As shown in FIGS. 2A to 2C, the rotating body aggregate 1 may sometimes be used with one end (coupling section 14 or coupling section 15) coupled to a coupling section 71 of a rotating body fixing member 70. The fixing member 70 is a portion of a moving apparatus such as an agricultural vehicle, a toy car, or a carriage, for example.

As shown in FIG. 3, the cylindrical rotating body 10 includes a stator 11, a core 12, an exterior body 13, the first coupling section 14, and the second coupling section 15. In the present embodiment, the first coupling section 14 and the second coupling section 15 are formed integrally with the core 12, and the stator 11 is fixed inside the core 12.

The stator 11 constitutes a motor mechanism with the exterior body (rotor, rotator) 13. The stator 11 has an electric current control unit and a plurality of stator coils not shown and magnetically rotates the exterior body 13 disposed at an outer side of the stator 11 by power supplied from the outside. As described above, the stator 11 is fixed inside the core 12, and the first coupling section 14 formed integrally with the core 12 is fixed to the rotating body fixing member 70 as shown in FIG. 2B or 2C. The stator 11 can thus be fixed and the exterior body 13 can be rotated. FIG. 2B shows a configuration where each of the exterior bodies 13, 13 of the coupled cylindrical rotating bodies 10, 10 independently rotates, and FIG. 2C shows a configuration where the exterior bodies 13, 13 of the coupled cylindrical rotating bodies 10, 10 rotate in an interlocking manner. In the variation in FIG. 2C, end faces 13a, 13a of the exterior bodies 13, 13 at the coupled sides are zigzag, and mesh with each other to couple the exterior bodies 13, 13 together.

In the present embodiment, the first coupling section 14 and the second coupling section 15 have an electric contact point not shown, which allows the stator 11 to be supplied with power from the outside via the first coupling section 14 and the core 12. The cylindrical rotating body 10 can be supplied with power from a coupled external apparatus (rotating body fixing member 70) or a coupled cylindrical rotating body 10 at a power source side and can supply power to a coupled cylindrical rotating body 10 at a side opposite to the power source side. For example, in the examples shown in FIGS. 2B and 2C, power is supplied from the cylindrical rotating body 10 at the power source (rotating body fixing member 70) side (the left cylindrical rotating body 10 in FIGS. 2B and 2C) to the cylindrical rotating body 10 at the opposite side (the right cylindrical rotating body 10 in FIGS. 2B and 2C), and as a result, the two cylindrical rotating bodies can rotate at once. In the present embodiment, an electric motor is illustrated as the motor mechanism. However, the configuration of the motor mechanism is not limited thereto and may take any configuration that can make the exterior body 13 rotate, such as a hydraulic motor, a pneumatic motor, or a fuel-cell-type electric motor utilizing hydrogen. A plurality of motors or even a hybrid driving source including an engine and a motor may be employed as a driving source of one cylindrical rotating body.

The exterior body 13 is formed such that it covers the outer periphery of the core 12 and is rotatable. The exterior body 13 has, for example, a magnet and functions as a rotator (rotor) for the stator 11.

The first coupling section 14 and the second coupling section 15 disposed at ends are members for being coupled to the second coupling section 15 and the first coupling section 14 of another cylindrical rotating body 10, respectively, and have respective structures for mutual engagement with the second coupling section 15 and the first coupling section 14 of another cylindrical rotating body 10. For example, in the example shown in FIG. 1, the first coupling section 14 and the second coupling section 15 have spiral grooves (helicoids), which allows the first coupling section 14 to be screwed onto a second coupling section 15 of another cylindrical rotating body 10. In addition to the case of being coupled to a second coupling section 15 or a first coupling section 14 of another cylindrical rotating body 10, the first coupling section 14 or the second coupling section 15 is, in some cases, coupled to the coupling section 71 of the rotating body fixing member 70 as shown in FIGS. 2A and 2B or coupled to an accessory described later.

Figure 4A:
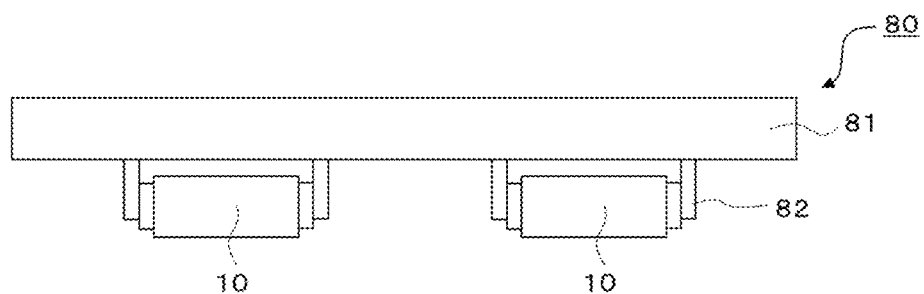
FIGS. 4A to 4C illustrate views showing examples of a carriage including the cylindrical rotating bodies according to the first embodiment, where
Figure 4B:
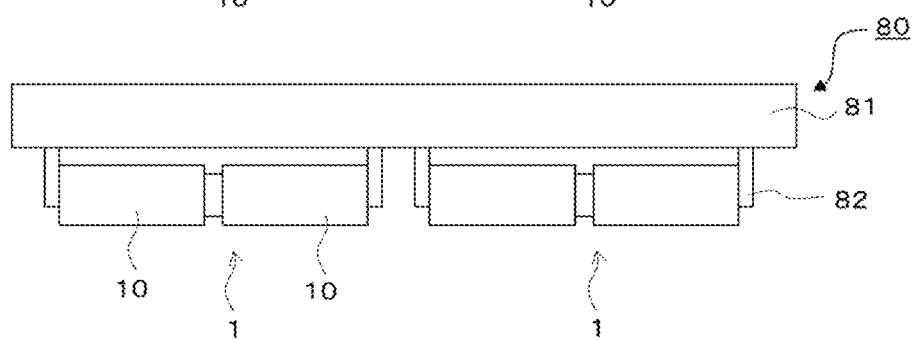
Figure 4C:
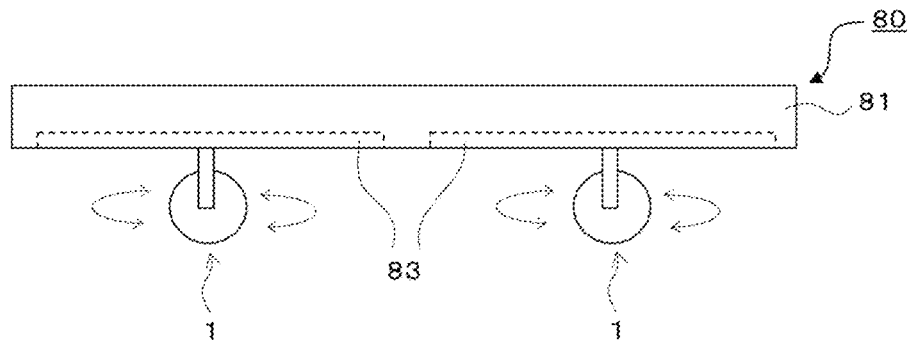

Here, FIGS. 4A to 4C illustrate views showing a carriage 80 as an example of a moving apparatus including the cylindrical rotating bodies 10 according to the first embodiment. The carriage 80 shown in FIG. 4A includes four cylindrical rotating bodies 10 disposed at vertices of a square or a rectangle on a bottom surface of a rack section (main body) 81 on which a load is placed, and a control unit (not shown). The control unit can separately drive the four cylindrical rotating bodies 10 used as wheels of the carriage 80 and control driving and stopping of each of the cylindrical rotating bodies 10 for veering. The number of the cylindrical rotating bodies 10 disposed below the bottom surface of the rack section 81 is not limited to four, and may be three, five, six, eight, or ten, for example.

As shown in FIG. 4B, a rotating body aggregate 1 having two cylindrical rotating bodies 10 coupled together may be used as each of the wheels of the carriage 80, whereby the rotating body aggregate 1 can provide sufficient driving force. Further, as shown in FIG. 4C, a plurality of rotary boards (turntables) 83 may be disposed below the bottom surface of the rack section 81 of the carriage 80, and the cylindrical rotating body 10 or the rotating body aggregate 1 may be attached to each of the rotary boards 83. This allows the carriage 80 to move not only in a front-back direction but in any direction including a left-right direction and the like. In the carriage 80 shown in FIGS. 4A to 4C, a leg section 82 has a coupling section for being coupled to the cylindrical rotating body 10 and functions as the rotating body fixing member (reference sign 70 in FIG. 1) to fix the cylindrical rotating body 10. A horizontal position of the leg section 82 is adjustable and, as shown in FIG. 4B, the leg section 82 can be coupled to the rotating body aggregate 1 made up of two or more cylindrical rotating bodies 10.

As described above, the cylindrical rotating body 10 according to the first embodiment has the motor (11, 13) therein and includes the first coupling section 14 and the second coupling section 15 capable of being directly coupled to another cylindrical rotating body to rotate integrally with the other cylindrical rotating body 10. Therefore, for example, as shown in FIG. 4B, the rotating body aggregate 1 constituted by coupling a plurality of the cylindrical rotating bodies 10 together can be used as a single wheel.

Second Embodiment

Next, a cylindrical rotating body 10a according to a second embodiment will be described. FIGS. 5A and 5B are block diagrams showing a configuration of the cylindrical rotating body 10a according to the second embodiment. The cylindrical rotating body 10a according to the second embodiment is configured similarly to the cylindrical rotating body 10 according to the first embodiment except for being extendable and contractable (that is, having an extendable mechanism) in a longitudinal direction.

In the second embodiment, a core 12a is constituted by a first core 121 and a second core 122 that are disposed in a nested manner. Spiral grooves (helicoids) are formed on mutual contact faces of the first core 121 and the second core 122, and rotation of the second core 122 with respect to the first core 121 can cause the core 12a to extend and contract in the longitudinal direction.

As shown in FIGS. 5A and 5B, an exterior body 13a is constituted by a first exterior body 131 and a second exterior body 132 that are disposed in a nested manner Just like the core 12a, spiral grooves (helicoids) are formed on mutual contact faces of the first exterior body 131 and the second exterior body 132, and rotation of the second exterior body 132 with respect to the first exterior body 131 can cause the exterior body 13a to extend and contract in the longitudinal direction.

In the second embodiment, the first core 121 and the second core 122, and the first exterior body 131 and the second exterior body 132 have helicoid grooves to constitute an extendable mechanism that makes the core 12a and the exterior body 13a extendable and contractable in the longitudinal direction. This makes the cylindrical rotating body 10a extendable and contractable in the longitudinal direction, but the extendable mechanism is not limited to this configuration. In the present embodiment, manual actions of extending and contracting the cylindrical rotating body 10a have been illustrated. However, the extendable mechanism is not limited to this configuration and may be constituted by an actuator (for example, a motor or a hydraulic cylinder) for extension and contraction of the cylindrical rotating body 10a to automatically perform the extension and contraction of the cylindrical rotating body 10a.

FIG. 27 is a side view of an extendable cylindrical body 90 to be connected to a rotating body aggregate according to the second embodiment. As shown in the figure, in a cylindrical main body 91, an extension-contraction control unit 92, an accumulator 93, and a cylinder tube 96a of a hydraulic cylinder 96 are arranged from the top to the bottom. The cylindrical main body 91 also has a changeover switch (not shown) therein.

The hydraulic cylinder 96 includes the cylinder tube 96a and a piston rod 96b that is reciprocably inserted into the cylinder tube 96a and protrudes from the cylindrical main body 91 to form a nested structure. The space in the cylinder tube 96a is separated with a piston 96c of the piston rod 96b into a first oil chamber 96e for retraction of the piston rod 96b and a second oil chamber 96f for extension of the piston rod 96b.

The accumulator 93 and the oil chambers 96e, 96f are connected by respective pipes, and a valve is interposed on each of the pipes (pipes and valves are not shown).

When a control signal is input from the extension-contraction control unit 92 to the changeover switch, the changeover switch switches between opening and closing of the valves. Supply and discharge of hydraulic oil (oil pressure) between the oil chambers 96e, 96f and the accumulator 93 can thus be controlled to adjust an amount of extension of the piston rod 96b.

A screw section 94 is formed at an upper end of the cylindrical main body 91, and a screw section 95 is formed at a lower end of the piston rod 96b. The screw section 94 and the screw section 95 have the same diameter as that of the second coupling section 15 of a cylindrical rotating body 10, and can be screwed into the first coupling section 14 of the cylindrical rotating body 10 for coupling as shown in FIG. 28. Thus, a cylindrical rotating body 10 having the extendable cylindrical body 90 coupled thereto is also included in the cylindrical rotating bodies having an extendable mechanism described in the specification. Unlike the configuration illustrated in the figure, one or both of the screw section 94 and the screw section 95 may be formed into a recessed coupling section having a spiral groove (helicoid) on the inner surface thereof as in the first coupling section 14 of the cylindrical rotating body 10 to be screwed onto the second coupling section 15 of the cylindrical rotating body 10.

As described above, the cylindrical rotating body 10a according to the second embodiment is extendable and contractable in the longitudinal direction. Accordingly, the cylindrical rotating body 10a can be used with the length thereof adjusted to user requirements.

Third Embodiment

Next, a cylindrical rotating body 10b according to a third embodiment will be described. FIG. 6 is a block diagram showing a configuration of the cylindrical rotating body 10b according to the third embodiment. As shown in FIG. 6, the cylindrical rotating body 10b according to the third embodiment is configured and operates similarly to the cylindrical rotating body 10 according to the first embodiment except for having a battery 16, a control unit 17, and a communication unit 18 therein.

The battery 16 is electrically connected to a stator 11, the control unit 17, and the communication unit 18, and supplies these members with power. A secondary battery can be used as the battery 16 and, in this case, the battery 16 may be directly connected to a commercial power source or a power generator to supply power or may be configured to be wirelessly charged by a publicly known method. Further, the battery 16 may be configured to be supplied with power from a photovoltaic generation apparatus or from a vehicle battery.

The control unit 17 is constituted by a microcomputer having a CPU, a ROM, and a RAM not shown, and controls traveling of the cylindrical rotating body 10 based on a traveling program stored in the ROM in advance. The control unit 17 can obtain a traveling program input by a user from external equipment (not shown) via the communication unit 18 to store the traveling program in the RAM. The control unit 17 can also perform traveling control according to the user's traveling program stored in the RAM.

The communication unit 18 is, for example, a wireless communication module capable of communication by Bluetooth (registered trademark) that is one of radio communication standards, wireless Local Area Network (LAN) communication, or wireless Wide Area Network (WAN) communication. The communication unit 18 receives signals of a traveling program input by a user from an external equipment (not shown) or the like, and transmits the signals to the control unit 17. Thus, motions of the cylindrical rotating body 10b can also be remotely controlled.

As described above, the cylindrical rotating body 10b according to the third embodiment includes the battery 16. This enables the cylindrical rotating body 10b to independently rotate even when no power is supplied from the outside such as a fixing member. The cylindrical rotating body 10 according to the present embodiment has the control unit 17 and rotation control can be performed based on a traveling program input by a user and received from the communication unit 18. This makes it possible to utilize the cylindrical rotating bodies 10b and a rotating body aggregate 1 constituted by cylindrical rotating bodies 10b as a toy car as an intellectual toy for programming learning.

Fourth Embodiment

Next, a rotating body aggregate 1a according to a fourth embodiment will be described. FIG. 7 is a perspective view showing a configuration of the rotating body aggregate 1a according to the fourth embodiment. In the rotating body aggregate 1a according to the fourth embodiment, cylindrical rotating bodies 10 are not coupled directly to each other, but are coupled together via a coupling member 20.

The coupling member 20 is a cylindrical member for coupling two or more cylindrical rotating bodies 10. In the present embodiment, the coupling member 20 includes, as shown in FIG. 1, on both ends of a trunk section 24, a protruded coupling section 21 and a recessed coupling section 22 for being coupled to a first coupling section 14 and a second coupling section 15 of the cylindrical rotating bodies 10, respectively.

A plurality of the cylindrical rotating bodies 10 can be coupled together via the coupling member 20 to rotate in the coupling state. The coupling member 20 is smaller and shorter in longitudinal length than the cylindrical rotating body 10. In other words, the diameter of the trunk section 24 is preferably equal to or smaller than the diameter of the cylindrical rotating body 10.

The coupling member 20 has electric contact points on the protruded coupling section 21 and the recessed coupling section 22, and can supply power supplied from the cylindrical rotating body 10 coupled to a power source side to the cylindrical rotating body 10 coupled to the other side via the electric contact points. The coupling member 20 in a preferred mode communicatively connects the cylindrical rotating bodies 10, 10 coupled together via the coupling member 20. The coupling member 20 may be provided with a motor that assists rotation of a motor of the cylindrical rotating body 10. From another point of view, the coupling member 20 may be constituted by a short cylindrical rotating body 10 having a motor mechanism therein.

Accordingly, in the rotating body aggregate 1a according to the fourth embodiment, a plurality of the cylindrical rotating bodies 10 are coupled together via the coupling member 20 and can integrally rotate.

Fifth Embodiment

Next, a carrier apparatus 53 including a rotating body aggregate 1b according to a fifth embodiment will be described. FIG. 8 is a view showing a mode of the rotating body aggregate 1b according to the fifth embodiment where cylindrical rotating bodies 10 are not coupled together yet, and FIG. 9 is a view showing a mode of the rotating body aggregate 1b according to the fifth embodiment where the cylindrical rotating bodies 10 have been coupled together. The rotating body aggregate 1b according to the fifth embodiment is configured and operates similarly to the rotating body aggregate 1a according to the fourth embodiment except that a coupling member 20a has a shaft 23 and, as shown in FIGS. 8 and 9, is turnable around the shaft 23.

As shown in FIG. 8, the coupling member 20a has the shaft 23 in a middle between trunk sections 26, 27. The shaft 23 is turnable around one axis or a plurality of axes. Coupling sections 21, 22 on both ends of the coupling member 20a can be coupled to coupling sections 14, 15 of the cylindrical rotating bodies 10, as in the fourth embodiment. Further, in the fifth embodiment, the coupling member 20a has an actuator (not shown) for turning around the shaft 23, and the shaft 23 is turnable based on control from the outside. Such control signals for turning are electrically transferred from the outside to the coupling member 20a via, for example, an above-described rotating body fixing member 70 and the cylindrical rotating body 10.

The shaft 23 of the coupling member 20a can turn to make an angle θ between the two cylindrical rotating bodies 10 (that is, the trunk sections 26, 27) less than 180° as shown in FIG. 9. The rotating body aggregate 1b can thus form into, for example, as shown in FIGS. 10A and 10B, a hook shape (U-shape or O-shape (with a locking mechanism)) and constitute the carrier apparatus 53 as a moving apparatus that moves with a motion of holding an object like a human finger.

Figures 10A, 10B:
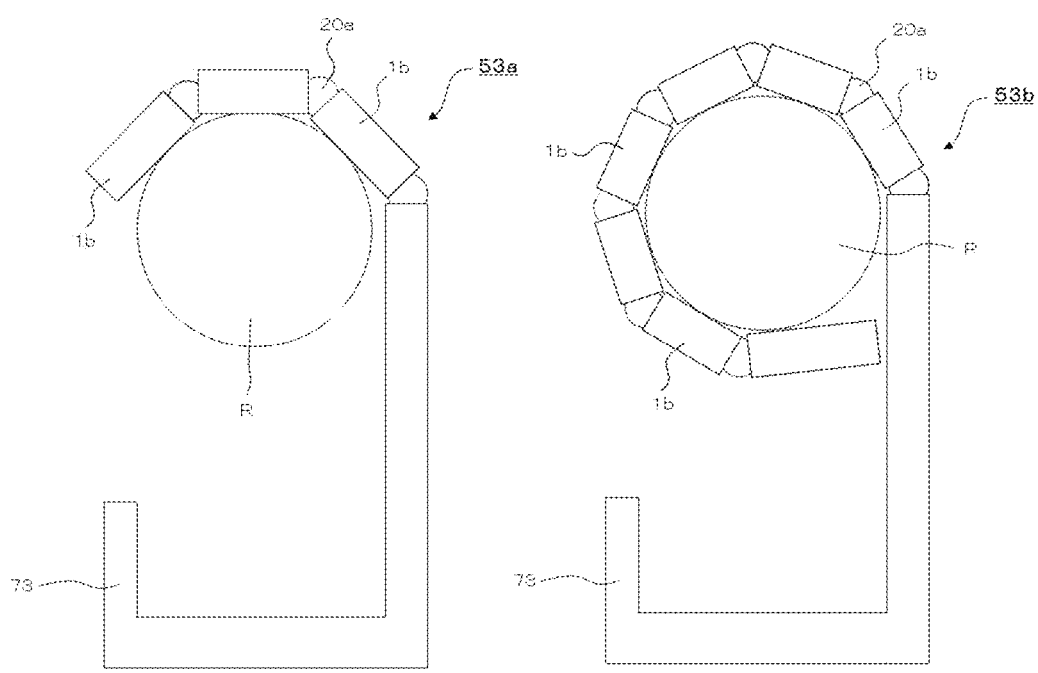
FIGS. 10A and 10B illustrate views showing moving apparatuses each including the rotating body aggregate according to the fifth embodiment, where

As shown in FIGS. 10A and 10B, the carrier apparatus 53 can be configured such that the rotating body aggregate 1b rotates and travels on a string-like member or an elongated member R such as a rope while holding the elongated member R such as a rope. In other words, three or more (for example, three to twelve, or four to ten) cylindrical rotating bodies 10 are coupled together via a plurality of the coupling members 20a, and can thus constitute the carrier apparatus 53 that holds the elongated member R such as a rope by forming the three or more cylindrical rotating bodies 10 into a closed shape (polygonal shape having three or more corners) and moves along the elongated member by rotating motions of the respective cylindrical rotating bodies 10.

As shown in FIG. 10A, the rotating body aggregate 1b, by attaching a hook or basket 73 to a fore end thereof, can be utilized as a carrier apparatus 53a that is a transportation lift (trolley) that transports a load along a rope. A configuration by which an operator and a robot is transported is also possible by attaching a handle (bar) or a hook instead of the basket 73. For stopping, it is also possible to make the angle made by the shaft 23 further smaller and the rotating body aggregate 1b further strongly grip the elongated member R such as a rope for applying a brake. Note that FIGS. 10A and 10B illustrate views showing usage examples of the rotating body aggregate 1b according to the fifth embodiment. The example shown in FIG. 10A illustrates the configuration where the carrier apparatus (transportation lift) 53a having the rotating body aggregate 1b travels on the horizontally stretched rope. However, the present invention is not limited to this configuration and, for example, the carrier apparatus (transportation lift) having the rotating body aggregate 1b may be configured to go up and down on the elongated member R such as a vertically stretched rope (or a columnar member P such as a substantially vertically standing pole).

FIG. 29 is a plan view of a lifting apparatus 100 including rotation aggregates 10 with extendable cylindrical bodies 90 connected to both ends thereof. Although simply drawn in FIG. 29, the extendable cylindrical bodies 90 have the same configuration as the extendable cylindrical body 90 in FIG. 27. The extendable cylindrical bodies 90 each have one end coupled to the rotation aggregate 10 and the other end connected to a coupling member 51 to form a triangular space in which the columnar member P such as a pole is held. The coupling member 51 functions as a movable shaft that can vary an angle between the two connected extendable cylindrical bodies 90. The lifting apparatus 100 including the coupling members 51 and the extendable cylindrical bodies 90, by making the six extendable cylindrical bodies 90 variable in length, perform lifting and lowering motions while maintaining contact with the columnar member P such as a pole by changing the size of the triangular space even when the diameter of the columnar member P such as a pole is not uniform. Thus, even when the columnar member P such as a pole changes in diameter in a longitudinal direction, for example, like a natural tree or a power pole, lifting and lowering motions are performable.

The cylindrical rotating bodies 10 may be attached to be rotated to a hook or basket 73 of which bottom the cylindrical rotating bodies 10 are attachable to and detachable from. There can thus be provided a hook or basket 73 capable of self-traveling only when the cylindrical rotating bodies 10 are attached to the bottom.

As described above, in the rotating body aggregate 1b according to the fifth embodiment, the angle between two of the cylindrical rotating bodies 10 can be made smaller than 180°, which allows the rotating body aggregate 1b to hold, for example, as shown in FIGS. 10A and 10B, the string-like member or the elongated member R such as a rope and to rotate and travel on the rope. Additionally, such a rotating body aggregate 1b, by attaching a basket, a handle, a hook, or the like thereto, can be utilized as a lift that transports a load, a person, a robot, an agricultural machine, a construction engineering machine, or the like along the string-like member.

Sixth Embodiment

Figure 11A:
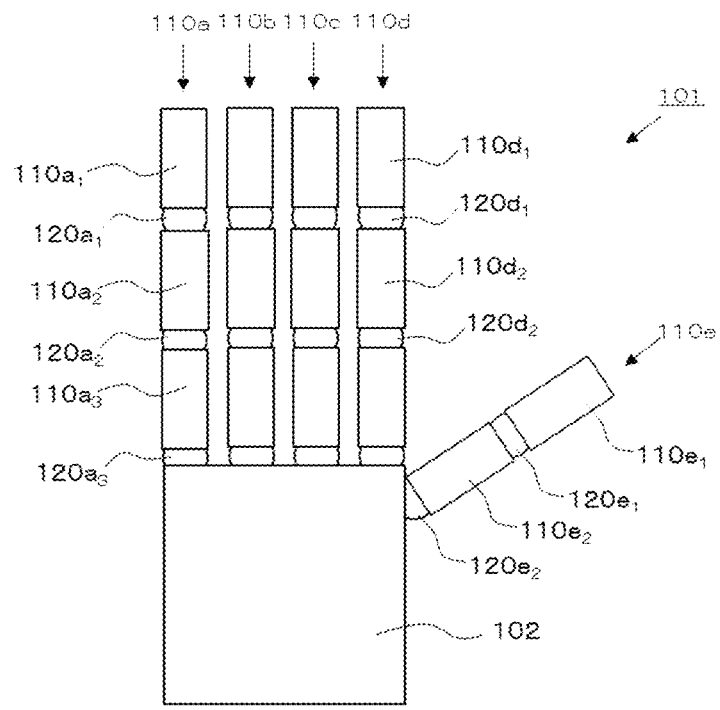
FIGS. 11A to 11C illustrate views showing examples of a robot hand including a rotating body aggregate according to a sixth embodiment, where
Figure 11B:
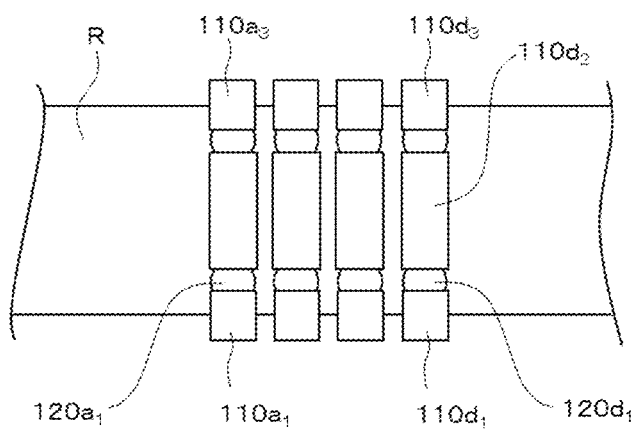
Figure 11C:
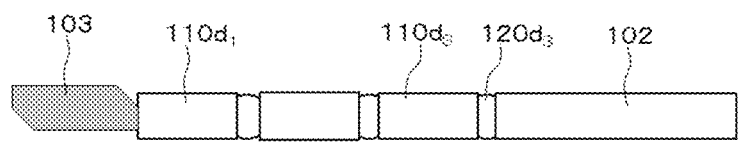

Next, in a sixth embodiment, a robot hand 101 having a rotating body aggregate 1b will be described. FIGS. 11A to 11C illustrate views showing examples of the robot hand 101 according to the sixth embodiment. In the robot hand 101 according to the sixth embodiment, each of finger parts (110a to 110e) has a configuration similar to that of the rotating body aggregate 1b according to the fifth embodiment, and coupling members $120a_3$ to $120e_2$ disposed at lower ends of the finger parts are coupled to five coupling sections disposed on a back-of-hand section 102. Each of the coupling members $120a_3$ to $120e_2$ has a configuration similar to that of the coupling member 51, and functions as a movable shaft that can vary an angle between two connected finger parts 110.

In the views illustrated in FIGS. 11A to 11C, only the back-of-hand section 102 of a robot is indicated as a main body, but the back-of-hand section 102 may be coupled to a working multi-axis robot arm, or to a robot arm of a humanoid robot. A configuration is also possible where the rotating body aggregate 1b is attachable to and detachable from the back-of-hand section of a robot hand of a humanoid robot, and is attached to the robot as necessary. The number of the finger parts (110a to 110e) may be arbitrary, and a configuration without a thumb (110e) is also possible. Power and control signals for operating the rotating body aggregates 110a to 110e as the finger parts of the robot hand are supplied from a back-of-hand section 102 side, which allows for independent rotation of each of a plurality of cylindrical rotating bodies $110a_1$ to $120e_2$ constituting respective fingers of the robot hand. The coupling members $120a_3$ to $120e_2$ each have an actuator that turns a movable shaft to adjust an angle between the finger parts 110, and turning the coupling members $120a_3$ to $120e_2$ based on the power and the control signals supplied from the back-of-hand section 102 side can cause motions such as gripping a string-like member R such as a rope as shown in FIG. 11B.

For example, as shown in FIG. 11B, it is possible to make the rotating body aggregates 1b hold the string-like member R such as a rope to, for example, cause the robot per se having this robot hand to float from the ground and move over the string-like member R such as a rope. It is also possible to cause the robot hand to grip weeds (pinch weeds between a cylindrical rotating body 110 and a cylindrical rotating body 110 each corresponding to a finger of the robot hand) by adjusting the angles made by the coupling members $120a_3$ to $120e_2$, and perform a motion of pulling out the gripped weeds from the ground by rotating the respective cylindrical rotating bodies 110. Further, it is also possible to cause the robot hand 101 to perform a motion such as digging dirt (boring), softening dirt, or mixing dirt, or work such as engineering by attaching a tool to a fore end of the finger parts of the robot hand 101 (a fore end of the cylindrical rotating bodies $110a_1$ to $110e_1$), the tool being a blade, a sickle, a claw, scissors, a cutter, a trimmer, a mixer, a driver, pliers, nippers, a soldering copper, a welding torch, or the like. It is also possible to cause the robot hand to grip a fruit or a vegetable (for example, a Chinese cabbage, a cabbage, a turnip, and the like) by adjusting the angles made by the coupling members $120a_3$ to $120e_2$, and perform a motion of plucking off the fruit or the vegetable or a motion of twisting fruit by rotating the respective cylindrical rotating bodies 110, the motion of twisting fruit being intended to equalize sunlight irradiation necessary for growth through gripping and twisting an apple or the like. In this case, as shown in FIG. 11C, it is also possible, by attaching an edge tool 103 to a fore end of the fingers of the robot hand (a fore end of the cylindrical rotating bodies $110a_1$ to $110e_1$), to cut off a stem end of a fruit or a root of a vegetable with the edge tool 103 and harvest it by rotating the edge tool 103 by rotating the cylindrical rotating body 110.

Furthermore, it is also possible to cause the robot hand 101 to agitate powder, liquid, or the like, or perform a motion of kneading cray for ceramic art, noodle dough, bread dough, or the like. In this case, irregularities or an agitating vane may be attached to a surface of the cylindrical rotating body 110.

Note that the angles made by the coupling members $120a_3$ to $120e_2$ can be adjusted based on instructions from a controller installed at the back-of-hand section 102 side, for example. Such a robot hand 101 can also perform a motion of petting an animal and a plant and, further, a motion of rubbing for processing a workpiece (for example, deburring, grinding/chamfering) by rotating the cylindrical rotating body 110.

Seventh Embodiment

Next, a moving apparatus according to a seventh embodiment will be described. Here, FIG. 12 is a diagram showing an example of the moving apparatus 72 according to the seventh embodiment. The moving apparatus 72 includes two elongated coupling members 20b attachable to a bottom surface of a main body (not shown), and three cylindrical rotating bodies 10. As shown in FIG. 12, the plurality of cylindrical rotating bodies 10 are arranged in a lateral width direction thereof at regular intervals and coupled together via the coupling members 20b. For example, in the example shown in FIG. 12, the coupling members 20b each have protruded coupling sections 21b as many as the cylindrical rotating bodies 10 to be coupled together. The three cylindrical rotating bodies 10 function as driving wheels by coupling respective coupling sections 14, 15 of the cylindrical rotating bodies 10 to the protruded coupling sections 21b. The coupling members 20b are connected to a power source (not shown) installed on the main body for supplying power to the cylindrical rotating bodies 10 and a control unit (not shown) installed on the main body for transferring control signals to the cylindrical rotating bodies 10. The protruded coupling sections 21b each have an electric contact point and are capable of supplying power to the respective cylindrical rotating bodies 10 via the electric contact point.

As described above, in the moving apparatus 72 according to the seventh embodiment, a plurality of the cylindrical rotating bodies 10 are arranged in the lateral width direction thereof and coupled together, which allows the plurality of the cylindrical rotating bodies 10 to rotate in a coupling state as in the first embodiment.

The moving apparatus 72 can be used as an apparatus for another purpose by modifying the main body. For example, in a rotating body aggregate 1c, noodle dough or bread dough may be passed between the rotating cylindrical rotating bodies 10, and there can thus be provided a kneading apparatus that kneads dough. Similarly, cray used for ceramic art may be passed between the rotating cylindrical rotating bodies 10, and there can thus be provided a kneading apparatus that kneads cray for ceramic art. Further, a configuration where, in the rotating body aggregate 1c, one of the two coupling members 20b is detached is also possible. The moving apparatus 72 can also be used, by attaching irregularities to surfaces of the cylindrical rotating bodies 10, as an agitating apparatus for powder, liquid, or the like, a cleaning vehicle that cleans a surface of glass or wood floor, a washing apparatus that washes dishes or foodstuffs, a working apparatus for scaling a fish, or a massage device (apparatus) for a human body. A configuration where rotating motions automatically start in response to an infrared sensor may be utilized as crime prevention security equipment (apparatus) or a device (apparatus) for repelling harmful animals.

Eighth Embodiment

Next, a mowing mechanism 41 and a mowing apparatus 40 constituted by a rotating body aggregate according to an eighth embodiment will be described. FIG. 13 illustrate diagrams showing examples of agricultural equipment (the mowing mechanism 41 and the mowing apparatus 40) including the rotating body aggregate according to the eighth embodiment. As shown in FIG. 13a, cylindrical rotating bodies 10d according to the eighth embodiment have blades 19 attached to outer peripheral surfaces of exterior bodies 13 thereof. The cylindrical rotating bodies 10d each have a wheel 30 attached to an end thereof to constitute the mowing mechanism 41, the end being not coupled to a coupling member 20.

FIG. 13b-A is a perspective view showing the mowing apparatus 40 including mowing mechanisms each made up of three cylindrical rotating bodies 10d, FIG. 13b-B is a side view, and FIG. 13b-C is a plan view. As shown in FIGS. 13b-A to 13b-C, a rotating body aggregate 1d can be utilized, for example, as the mowing mechanism by coupling the plurality of cylindrical rotating bodies 10d with blades 19 together. Note that, as shown in FIG. 13a, each mowing mechanism may be constituted by a plurality of the cylindrical rotating bodies 10d. The mowing apparatus 40 is configured as a self-traveling moving apparatus by attaching wheels 30 to both ends of the rotating body aggregates 1d and driving the wheels 30 using motors for the wheels (not shown). The mowing apparatus 40, when the sizes of the cylindrical rotating bodies 10d and the blades 19 included in the cylindrical rotating bodies 10d are changed, can be utilized as a tilling machine, a pruning machine, or a logging machine (especially, a logging machine for a shrub or a small shrub).

FIG. 30 is a side view showing a tilling mechanism 48 constituted by attaching tilling claws (34, 35) to a cylindrical rotating body 10h, and FIG. 31 is a plan view showing a relevant part of the tilling mechanism 48.

The tilling mechanism 48 includes a plurality of flanges 33 fixed to an exterior body 13 and plural sets of right and left tilling claws (34, 35). Each of the flanges 33 has a plurality of through-holes 38 through which a bolt B is inserted, and the plural sets of right and left tilling claws (34, 35) detachably fixed thereto by bolts B and nuts N. The right and left tilling claws (34, 35) each include an attachment base 36 having bolt insertion holes 37, and a bolt B is inserted through the bolt insertion hole 37 and the through-hole 38 to be fastened by a nut N. The exterior body 13 may have one or more flanges 33, and the number of the sets of right and left tilling claws (34, 35) attached to the flange 33 is also not limited to three as illustrated.

Figure 32A:
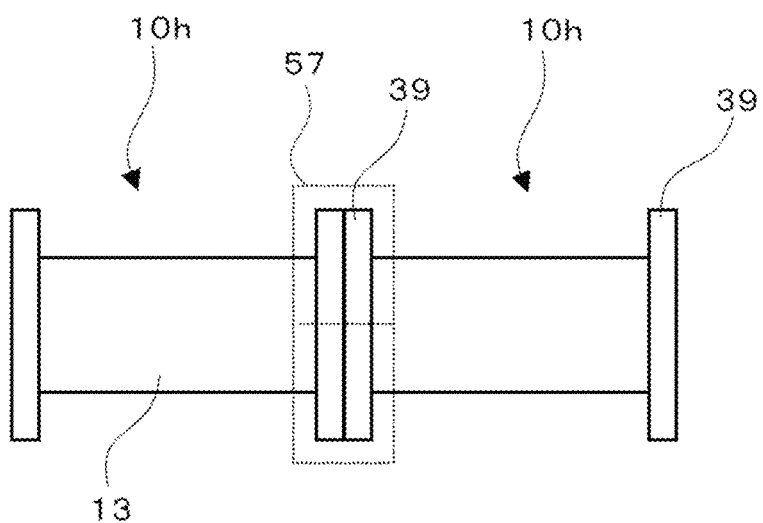
FIGS. 32A and 32B illustrate views showing a coupling mode of the cylindrical rotating bodies in FIG. 30, where
Figure 32B:
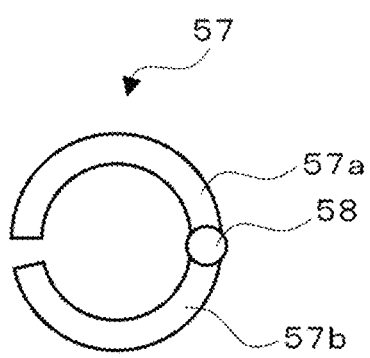

FIG. 32A is a side view of the cylindrical rotating bodies 10h coupled together, and FIG. 32B is a side view of a coupling tool 57. Note that the flanges 33 disposed on the exterior body 13 are not shown in FIGS. 32A and 32B.

The cylindrical rotating bodies 10h each have end flanges 39 at both ends thereof, and the end flanges 39 adjacent to each other are detachably fixed by the coupling tool 57.

The coupling tool 57 is a ring-shaped member having a hinge 58 around which an upper piece 57a and a lower piece 57b can be opened and closed. The upper piece 57a and the lower piece 57b each have a groove on an inner periphery thereof for housing a pair of end flanges 39, 39, and a locking tool not shown can lock the upper piece 57a and the lower piece 57b in a closed state.

Further, for example, as shown in FIGS. 32B and 32C, a coupling member 20e may have supporting poles 24 and a coupling bar 28 for weeding work in fields where cultivated plants such as seedlings and spikes are planted at regular intervals. In this case, the height of the supporting poles 24 of the coupling member 20e is set higher than the height of the cultivated plants, and the cylindrical rotating bodies 10d having the blades 19 rotate and travel on paths among the cultivated plants, which allows the cylindrical rotating bodies 10d to remove weeds or the like grown among the cultivated plants. It is thus possible to prevent the coupling member 20e from hitting the cultivated plants by setting the height of the supporting poles 24 of the coupling member 20e higher than the height of the cultivated plants. In the example shown in FIG. 13B, the supporting pole 24 extending in a height direction is a simple pole-shaped member, but a part of the supporting pole may be constituted by a cylindrical rotating body 10 or an extendable cylindrical body 90. Since the cylindrical rotating body 10 or the extendable cylindrical body 90 are automatically or manually extendable and contractable, the configuration where a part of the supporting pole 24 is constituted by the cylindrical rotating body 10 or the extendable cylindrical body 90 makes the height of the supporting pole adjustable.

Further, as shown in FIG. 14, there can also be provided a mowing apparatus (agricultural vehicle) 40 such that cylindrical rotating bodies 10d and 10e are attached to fit ridges 45. In other words, the mowing apparatus 40 may include the cylindrical rotating bodies 10d that perform mowing in ditches among the ridges 45, and the cylindrical rotating bodies 10e that perform mowing on slopes of the ridges 45 or formation of the ridges. The cylindrical rotating bodies 10d each include an exterior body 13 including blades 19 for mowing, and are disposed below bases 49a to 49c. The bases 49a to 49c are coupled to supporting poles 42a to 42c, respectively. The bases 49a to 49c may have rotary boards (turntables) to be rotatable around the supporting poles 42a to 42c. Such a configuration allows for traveling not only in a longitudinal direction but also in an oblique direction and a lateral direction.

The cylindrical rotating body 10e that contacts a slope of the ridge 45 includes blades 19 similar to those of the cylindrical rotating body 10d, and a coupling member 20d can make an angle between the cylindrical rotating body 10e and coupling bars 44a to 44c variable. For example, the cylindrical rotating body 10e positioned on a left side of a mowing mechanism 41c in FIG. 14 is lifted by the coupling member 20d so as not to contact a top of the ridge 45. The coupling member 20d has an actuator (not shown) similar to that of the coupling member 20a and, based on control from the outside, can vary an angle between the two connected cylindrical rotating bodies 10e. The position of the cylindrical rotating body 10e with respect to the ridge 45 is thus variable, which allows for, for example, performing weeding work while avoiding crops when the crops are planted on a top of the ridges 45.

Note that, when performing formation of the ridge 45 on a slope of the ridge 45, the cylindrical rotating body 10e may have no blade 19. In the example shown in FIG. 14, the cylindrical rotating bodies 10e are disposed on both slopes of the ridge 45 to face them. However, the present invention is not limited to this configuration, and a configuration is also possible where the cylindrical rotating body 10e is disposed on only one slope of the ridge 45 to face it. FIG. 14 illustrates a configuration where three mowing mechanisms 41a to 41c are coupled together, but the number of the coupled mowing mechanisms is not limited to three as illustrated, and may be two, four, or more. As shown in FIG. 13C, the mowing mechanisms 41 may be arranged in a matrix (n-by-m array).

The coupling bars 44a to 44c included in the mowing mechanisms 41a to 41c can go up and down along the supporting poles 42a to 42c to lift and lower the cylindrical rotating bodies 10e and to vary the angles thereof with respect to the ridges 45 in response to a button operation by an operator or by automatic control. This makes it possible to avoid crops even when the crops are planted on the ridges 45. The cylindrical rotating bodies 10e may be automatically lifted or lowered and the angles thereof with respect to the ridges 45 may be automatically varied by attaching an object detection sensor such as a photoelectric sensor to the mowing mechanisms 41a to 41c, the supporting poles 42a to 42c, or the like. The cylindrical rotating bodies 10e may be coupled to both ends of the cylindrical rotating body 10d.

As described above, in the eighth embodiment, the configuration where the cylindrical rotating bodies 10d have the blades 19 can realize the agricultural equipment (agricultural vehicle) using the rotating body aggregate.

Ninth Embodiment

Next, a rotating body aggregate 1g according to a ninth embodiment will be described. Here, FIG. 15 is a view showing an example of an agricultural vehicle (agricultural equipment) 32 including the rotating body aggregate 1g according to the ninth embodiment. The agricultural vehicle (agricultural equipment) 32 according to the ninth embodiment has three kinds of cylindrical rotating bodies 10d, 10g1, 10g2, and the plurality of cylindrical rotating bodies 10d, 10g1, 10g2 are coupled together via coupling members 20, 20b in a longitudinal direction and a width direction of the rotating bodies. Two wheels 30 are disposed on each side surface of the coupling members 20b, and the wheels 30 allow for self-traveling with power supplied from a power source installed on a main body not shown.

As in the eighth embodiment, the cylindrical rotating body 10d includes blades 19 on a surface thereof and functions as a mowing mechanism 41. The cylindrical rotating body 10g1 has a switching valve (openable charging port) through which seeds are put into the cylindrical rotating body 10g1, a storage chamber for storing the seeds, and an openable discharge port for sowing the seeds in the storage chamber, and functions as a sowing mechanism 46. The cylindrical rotating body 10g2 has a switching valve through which water is put into cylindrical rotating body 10g2, and apertures (discharge ports) for spraying the water, and functions as a watering mechanism 47. The agricultural vehicle (agricultural equipment) 32 including the rotating body aggregate 1g can thus perform tilling, sowing, and watering at once while moving.

FIG. 15 illustrates the agricultural vehicle (agricultural equipment) that performs tilling, sowing, and watering at once, but the present invention is not limited to this configuration. The cylindrical rotating bodies with respective different functions can constitute an agricultural vehicle (agricultural equipment) that performs different motions at once. For example, the watering mechanism 47 may spray disinfectant, fertilizer, herbicide, pollen, or the like instead of water.

Tenth Embodiment

Next, a tenth embodiment will be described. Here, FIG. 16A is a diagram showing an example of a working apparatus 3 including a cylindrical rotating body 10, FIG. 16B is a diagram showing an example of a working apparatus 3a including a rotating body aggregate 1e, and FIG. 16C is a diagram showing an example of a working apparatus 3b including a rotating body aggregate 1f having bending sections. As shown in FIGS. 16A to 16C, the working apparatuses 3, 3a, 3b according to the tenth embodiment are each constituted by a base section (lower section of a fingerstall) 31 and the cylindrical rotating body 10 or the rotating body aggregate 1. The base section 31 having a truncated-cone-shaped inner space into which a human finger can be fitted functions as a fingerstall that can be designed depending on a size of each finger. The fore end of the working apparatus 3 is constituted by the cylindrical rotating body 10 or the rotating body aggregate 1. The working apparatus 3b has bending sections constituted by coupling members 20a.

Power to the working apparatus 3 can be supplied by a battery disposed on the base section 31, or may be configured to be supplied directly from a commercial power source or the like via a power cable.

For example, the working apparatuses 3, 3a, 3b can be used as follows. For example, they can be used as a hygiene instrument for wiping a human body, especially, an oral cavity by attaching a cloth for wiping off dirt to an outer periphery of an exterior body 13 of the cylindrical rotating body 10. They can also be used as a toothbrush by attaching a brush for removing dirt to an outer periphery of the exterior body 13 of the cylindrical rotating body 10. Especially, according to the working apparatus 3b, the rotating body aggregate 1f allows for brushing front and back sides of a tooth T at once (also gums at once). They can also be used as a drill by attaching a drill blade to an end of the exterior body 13 of the cylindrical rotating body 10. Further, the working apparatus 3, by attaching a spoon to a fore end thereof, can also assist a person who requires care to eat. The working apparatus 3 may also include a publicly known suction mechanism for sucking sputum from a throat to easily suck sputum of a person who requires care. The working apparatus 3 may be used for applying medicine by covering a surface of the exterior body 13 of the cylindrical rotating body 10 with an elastic body such as rubber.

As described above, the working apparatuses 3, 3a, 3b according to the tenth embodiment have the cylindrical rotating body 10 or the rotating body aggregate 1 attached to a fore end thereof to be utilized in situations of hygiene maintenance and caring. The above-described examples have illustrated the configurations as a fingerstall used with a fore end of a finger fitted thereinto, but the present invention is not limited to a fingerstall. For example, the cylindrical rotating body 10 or rotation aggregate 1 may be attached to a fore end of a finger of a glove via the base section 31.

Eleventh Embodiment

Next, a rotating body aggregate 1h according to an eleventh embodiment will be described. FIG. 17A is a diagram showing a coupling member 50 that constitutes the rotating body aggregate 1h according to the eleventh embodiment, and FIG. 17B is a diagram showing the rotating body aggregate 1h according to the eleventh embodiment. The rotating body aggregate 1h according to the eleventh embodiment is configured and operates similarly to the rotating body aggregate 1 according to the first embodiment except for including the coupling member 50.

As shown in FIG. 17A, the coupling member 50 is cubic and has a plurality of protruded coupling sections 21 and a plurality of recessed coupling sections 22. The example shown in FIGS. 17A and 17B illustrate a configuration where three of six faces of the cube have the protruded coupling sections 21 and the remaining three faces have the recessed coupling sections 22. However, the present invention is not limited to this configuration and the numbers of the protruded coupling sections 21 and the recessed coupling sections 22 can be appropriately changed. The present embodiment illustrates the cubic coupling member 50, but the present invention is not limited to this configuration, and the shape may be a cuboid. Further, the shape is not limited to a hexahedron, and may be a pentahedron, a tetrahedron, or a polyhedron having seven faces or more. Further, the shape may be a sphere or the like.

FIG. 17B illustrates a configuration where cylindrical rotating bodies 10 are coupled to the coupling member 50 shown in FIG. 17A. Up to six cylindrical rotating bodies 10 can be coupled to the coupling member 50 shown in FIG. 17A. In FIG. 17B, the recessed coupling sections 22 of the coupling member 50 are coupled to the cylindrical rotating bodies 10 via coupling members 20, but may be coupled directly to the cylindrical rotating bodies 10. In the present embodiment, the protruded coupling sections 21 and the recessed coupling sections 22 are fixedly coupled to the cylindrical rotating bodies 10, but may be configured like a ball joint to make attachment angles at the cylindrical rotating bodies 10 variable.

Figure 18A:
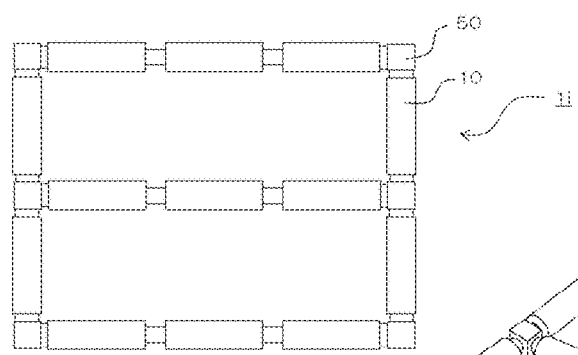
FIG. 18A illustrates a view showing a moving apparatus including the rotating body aggregate according to the eleventh embodiment.
Figure 18B:
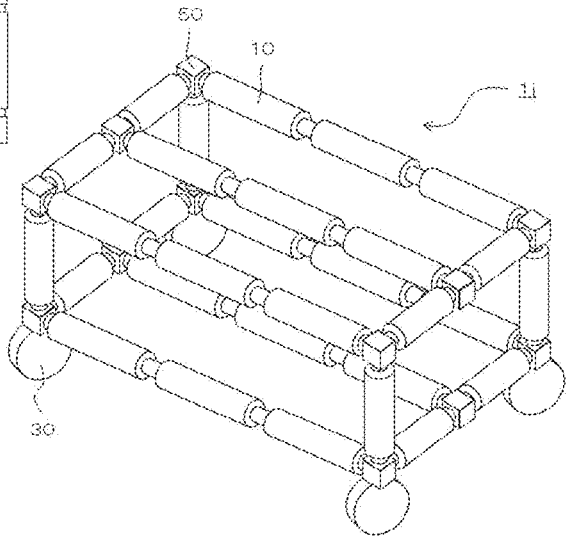
FIG. 18B illustrates a view showing a moving apparatus including the rotating body aggregate according to the eleventh embodiment.

Coupling a plurality of the cylindrical rotating bodies 10 together via the coupling member 50 can realize various shapes to constitute, for example, as shown in FIG. 18A, a rotating body aggregate 1$i$ where the cylindrical rotating bodies 10 are two-dimensionally arrayed and a rotating body aggregate 1$j$ where the cylindrical rotating bodies 10 are three-dimensionally arrayed. The rotating body aggregate 1$j$ has four wheels 30 disposed below a lower surface thereof. These wheels 30 may be replaced with road rollers or caterpillars, or the cylindrical rotating bodies 10 may be used as wheels for traveling instead of the wheels 30. As shown in FIG. 18B, when the cylindrical rotating bodies 10 are three-dimensionally arrayed, extension and contraction of the cylindrical rotating bodies 10 that are extendable in a height direction allow for adjustment of the height of the rotating body aggregate 1$j$.

As shown in FIG. 18B, the rotating body aggregate 1$j$ where the plurality of cylindrical rotating bodies 10 are three-dimensionally coupled together can also be utilized as a pallet (a load rack for physical distribution on which a load is placed). The rotating body aggregate 1$j$, by disposing a basket (box) within the frame of the cylindrical rotating bodies 10, can also be utilized as an apparatus that automatically conducts harvest work by rotating the cylindrical rotating bodies 10 at the top. There can also be provided a pallet capable of self-traveling, although not shown, by attaching the rotating body aggregate 1$i$ to a lower surface of a typical pallet. In this case, the cylindrical rotating bodies 10 can be stored in the pallet during standing still and deployed from the pallet only during traveling. It is preferable that the pallets using the cylindrical rotating bodies 10 are designed to be stacked on top of one another.

Figure 18C:
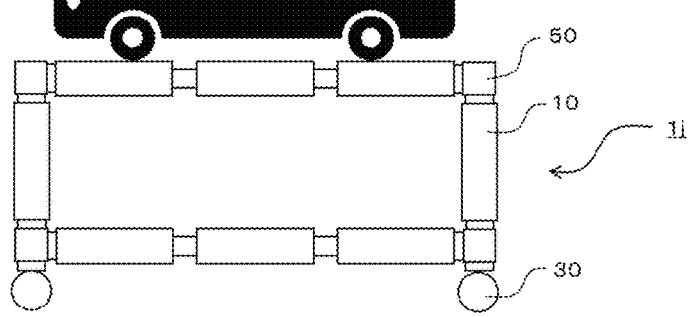
FIG. 18C illustrates a view showing a moving apparatus including the rotating body aggregate according to the eleventh embodiment.

As shown in FIG. 18C, a vehicle can also be mounted on the rotating body aggregate 1$j$. When a vehicle is mounted, a plate may be disposed on an upper surface of the rotating body aggregate 1$j$, or the cylindrical rotating bodies 10 may be arranged at such a narrow pitch that tires of the vehicle can be set thereon. A battery of the set vehicle can be used as a power source to drive the rotating body aggregate 1$j$.

In this way, the rotating body aggregates 1$h$ to 1$j$ according to the eleventh embodiment can be freely assembled by a user to form a moving apparatus by using the coupling members 50 having a plurality of faces each equipped with a coupling section, as shown in FIGS. 18A and 18B. It is also possible, by downsizing this moving apparatus, to play with it as a toy car that is formed by assembling the rotating body aggregates 1$h$ to 1$j$ like blocks. Further, the cylindrical rotating bodies 10 can be assembled like blocks to form a rotating body aggregate depending on a user's purpose. The coupling member 50 is only an example, and it is possible to utilize a coupling member with any shape that allows for piecing the cylindrical rotating bodies 10 together like blocks.

Twelfth Embodiment

Next, a moving apparatus 60 including rotating body aggregates 1$k$ according to a twelfth embodiment will be described. FIG. 19 is a view showing an example of the rotating body aggregates 1$k$ according to the twelfth embodiment. The example shown in FIG. 19 illustrates the moving apparatus 60 where the rotating body aggregates 1$k$ can be utilized as a pruning machine for symmetrically trimming a tree in Western-style garden or the like.

As shown in FIG. 19, in the moving apparatus 60 according to the twelfth embodiment, a plurality of cylindrical rotating bodies 10 are linearly coupled together with an upper part further stabilized by an elongated member R such as a rope or a rail and a turntable (rotary board) 63 to be formed into a triangular arch. A main body 61 including a plurality of pulleys 62 is movable along the elongated member R. The main body 61 and the rotating body aggregates 1$k$ are coupled together via the turntable 63, a height adjustment unit 64, and an opening adjustment unit 65. The height adjustment unit 64 can adjust a winding amount of a wire to adjust the height of the opening adjustment unit 65. In the example shown, the height adjustment unit 64 is constituted by two winches, but the number of the winches may be one, three, or more. The height adjustment unit 64 may be constituted by a unit other than the winches (for example, the extendable cylindrical body shown in FIG. 27). The opening adjustment unit 65 includes a driving unit capable of adjusting an opening-closing angle between right and left sides of a pruning mechanism 66 made up of the two rotating body aggregates 1$k$. Each side of the pruning mechanism 66 is constituted by the rotating body aggregate 1$k$. The number of the cylindrical rotating bodies 10 constituting the rotating body aggregate 1$k$ is not limited to four as illustrated, and may be one or more. The rotating body aggregate 1$k$ is coupled to a caster having wheels 30 at the lower end thereof to contact the ground. The wheel 30 may be a secondary wheel that is not coupled to a driving source, or may be a wheel capable of self-traveling connected to a driving source. Turning the turntable 61 can cause the rotating body aggregates 1$k$ also to rotate.

Blades 19 are attached to an exterior body 13 of each of the cylindrical rotating bodies 10 constituting the rotating body aggregate 1$k$. It is possible, by rotating the rotating body aggregates 1$k$ around a central line L such that tracks of the wheels 30 are circular, to remove extra branches of a tree surrounded by the rotating body aggregates 1$k$ and trim the tree into a circular cone shape.

As described above, according to the rotating body aggregates 1k according to the twelfth embodiment, there can be provided an apparatus for trimming a tree by coupling the plurality of cylindrical rotating bodies 10 together to form them into a triangular arch. In the example shown in FIG. 19, the rotating body aggregates 1k are formed into a triangular arch, but not limited to this shape, and may be formed into, for example, a mountain-shaped arch, a U-shaped arch, a trapezoid, or a cuboid. In other words, a U-shaped pruning mechanism may be constituted by forming the opening adjustment unit 65 in a long shape and installing a horizontally extending cylindrical rotating body or rotation aggregate having blades 19 attached thereto below the opening adjustment unit 65. The moving apparatus including the U-shaped pruning mechanism allows for efficient pruning work on a hedge or a grapevine trellis of which cross-section is a cuboid.

Turntables that rotate the rotating body aggregates 1k may be included instead of the casters having the wheels 30 at the lower end thereof, or cylindrical rotating bodies or rotating body aggregates as driving wheels may be included instead of the wheels 30.

Thirteenth Embodiment

Next, carriages 80a and 80b each including a cylindrical rotating body 10 according to a thirteenth embodiment will be described.

Figure 20A:
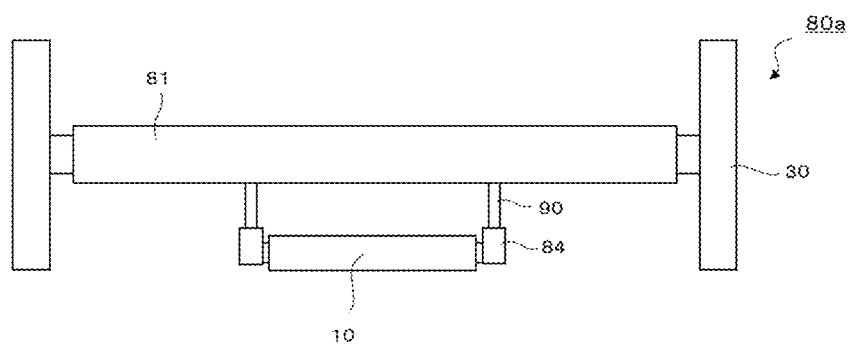
FIGS. 20A and 20B illustrate views for explaining moving apparatuses each including a cylindrical rotating body according to a thirteenth embodiment, where

FIG. 20A is a front view of the carriage 80a having a plurality of wheels 30 where the cylindrical rotating body 10 is attached below a rack section 81 of the carriage 80a via extendable cylindrical bodies 90 and wheel fixtures 84. When the extendable cylindrical bodies 90 are extended, the wheels 30 and the cylindrical rotating body 10 contact the ground. When the extendable cylindrical bodies 90 are contracted, only the wheels 30 contact the ground. The carriage 80a may have a power source unit and the cylindrical rotating body 10 may be supplied with power from the carriage 80a. In this case, a battery rechargeable from a commercial power source, a solar panel, or the like may be included as the power source unit of the carriage 80a. FIG. 20A illustrates a case where there is one cylindrical rotating body 10 but a plurality of cylindrical rotating bodies 10 may be attached. It is possible, by thus attaching the cylindrical rotating body 10 below the carriage 80a, to assist traveling and prevent overturn of the carriage 80a. It is also possible, by arranging protrusions at regular intervals on an exterior body 13 of the cylindrical rotating body 10, to further assist traveling and prevent overturn of the carriage on dirt with poor footing or the like. There can also be provided, by attaching blades 19 (not shown) to the exterior body 13 of the cylindrical rotating body 10, a carriage capable of weeding while transporting a load. A leg section made up of the extendable cylindrical body 90 and the wheel fixture 84 is extendable and contractable and allows for adjustment of the height of the cylindrical rotating body 10 depending on a traveling environment of the carriage 80b.

Figure 20B:
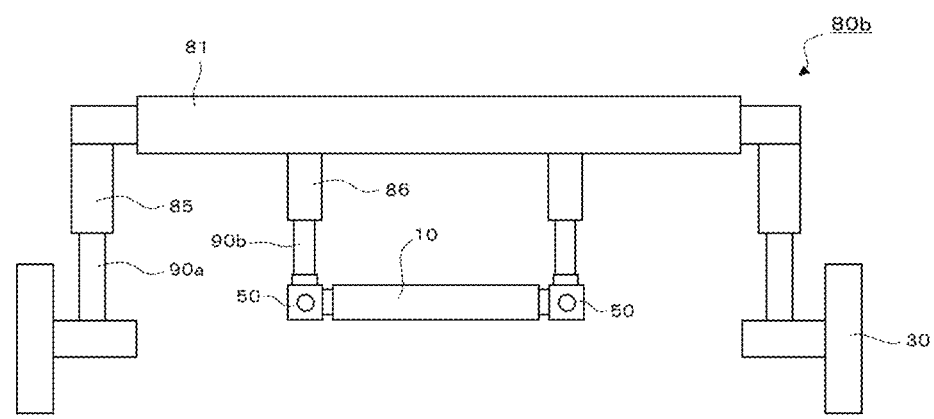

FIG. 20B is a front view of the carriage 80b where an extendable cylindrical body 90a is coupled to a wheel supporting pole 85 between the wheel 30 and the rack section 81. The carriage 80b can vary the distance between the rack section 81 and the wheels 30 (height of the carriage) by extending and contracting the extendable cylindrical bodies 90a. Unlike the figure, a plurality of the extendable cylindrical bodies 90a may be coupled to the wheel supporting pole 85. In the configuration shown in FIG. 20B, as in the example shown in FIG. 20A, the cylindrical rotating body 10 is included below the rack section 81 of the carriage body 10 to assist traveling and prevent overturn of the carriage 80b. A rotating body supporting pole 86 is coupled to an extendable cylindrical body 90b and, via a coupling member 50, to the cylindrical rotating body 10 installed below the carriage 80b in a horizontal direction. It is thus possible to vary the height position from the ground of the cylindrical rotating body 10 below the carriage 80b by extending and contracting the extendable cylindrical bodies 90b. Since the height position from the ground of the cylindrical rotating body 10 below the carriage 80b is variable, the length and the size of claws (protrusions) or blades to be attached to the cylindrical rotating body 10 below the carriage 80b can also be changed. It is also possible to attach a member such as a brush, a roller (for cleaning or painting), or the like to the cylindrical rotating body 10 below the carriage 80b instead of the claws or the blades. Road rollers or caterpillars may be disposed instead of the wheels 30.

Figure 21A:
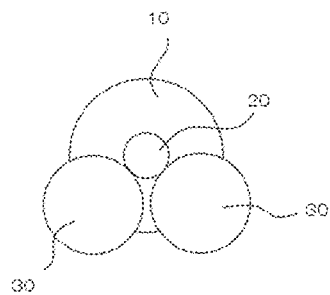
FIGS. 21A to 21D illustrate diagrams explaining variations of the moving apparatus according to the thirteenth embodiment, where
Figure 21C:
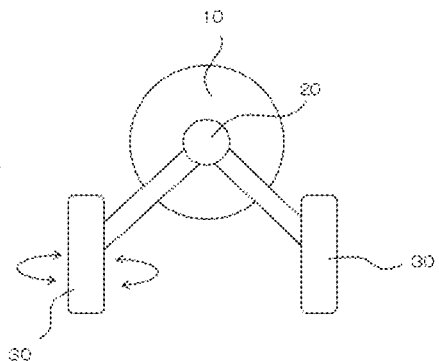
Figure 21B:
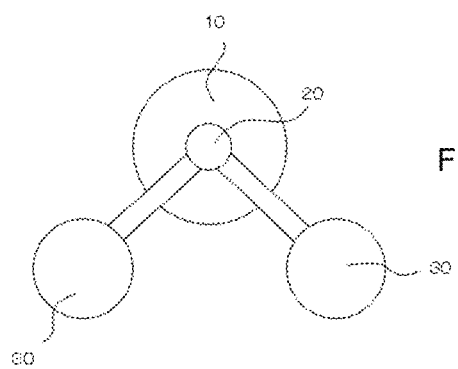

As shown in FIGS. 21A to 21D, the carriages 80a and 80b can be configured such that the wheel 30 includes two or more wheels 30 when viewed from a side thereof (in the lateral direction in FIGS. 20A and 20B). As shown in FIG. 21A, when there are two wheels 30, a coupling member 20 may be directly connected to the two wheels 30. As shown in FIG. 21B, a configuration where the wheels 30 are projected obliquely downward is also possible. This allows for varying the height of the cylindrical rotating body 10 with respect to the ground as appropriate. The wheels 30 may also include suspensions. Further, as shown in FIG. 21C, a traveling direction can also be changed by adding a rotation mechanism for rotating the wheels 30 around a vertical line to the configuration in FIG. 21B.

Figure 21D:
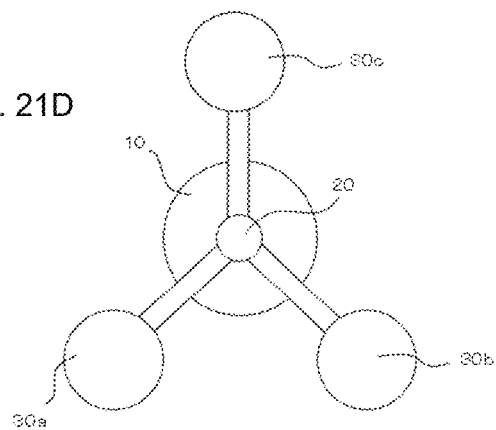

Furthermore, as shown in FIG. 21D, there can also be provided a three-wheel mechanism where wheels 30a to 30c are disposed on shafts extending radially from the coupling member 20. In this configuration, it is possible to take a first position where the wheels 30a and 30b contact the ground, a second position where the wheels 30c and 30a contact the ground, and a third position where the wheels 30c and 30b contact the ground, and thus also to climb stairs. Two three-wheel mechanisms disposed opposite to each other can be utilized as a cart by disposing a basket therebetween.

Fourteenth Embodiment

Next, a carrier apparatus 153 including a cylindrical rotating body 10 according to a fourteenth embodiment will be described. FIG. 22 is a side view of the carrier apparatus 153 including the cylindrical rotating body 10 according to the fourteenth embodiment.

As shown in FIG. 22, in the fourteenth embodiment, wheels 30b each having a groove corresponding to a diameter of a rope R are coupled to both ends of the cylindrical rotating body 10. The two ropes R are fitted into the grooves of the wheels 30b so that the cylindrical rotating body 10 rotates and travels along the two ropes R. It is also possible to cause holding mechanisms attached to both ends of the cylindrical rotating body 10 to hold two vertically hanging ropes R to cause the cylindrical rotating body 10 to rotate and travel in a vertical direction. The present embodiment disclosed the configuration where one cylindrical rotating body 10 links the two ropes R, R but, unlike this, a plurality of the cylindrical rotating bodies 10 coupled together may link the two ropes (see FIGS. 1 and 7, for example).

Fifteenth Embodiment

Next, a traveling apparatus 54 including cylindrical rotating bodies 10 according to a fifteenth embodiment will be described. FIG. 23 is a plan view of the traveling apparatus 54 including the cylindrical rotating bodies 10 according to the fifteenth embodiment.

As shown in FIG. 23, a plurality of cylindrical rotating bodies 10 may be coupled to a main body 55 like legs of a centipede to constitute the traveling apparatus 54. In this case, the main body 55 may include a battery 16 and a control unit 17 so that each of the cylindrical rotating bodies 10 is supplied with control signals and power from the main body 55 via a coupling member 20. The main body 55 has a plurality of sites to be coupled to the coupling members 20, and the cylindrical rotating bodies 10 are attachable to and detachable from the main body 55. Here, a rotation aggregate 1 made up of a plurality of cylindrical rotating bodies 10 serially connected via the coupling member 20 may be coupled to the main body 55 via the coupling member 20. A configuration where the cylindrical rotating bodies 10 or the rotating body aggregates 1 are attachable to and detachable from the main body 55 without using the coupling members 20 is also possible. The traveling apparatus 54 may be sized to be usable as a toy car.

The preferred embodiment examples of the present invention have been described above. However, the technical scope of the present invention is not limited to the description of the above-mentioned embodiments. Various alterations and modifications can be applied to the above embodiment examples, and such altered or modified modes also fall within the technical scope of the present invention.

For example, in the fifth embodiment described above, as shown in FIG. 9, the configuration has been illustrated where the coupling member 20a has an actuator that turns the shaft 23 and an external control unit controls turning of the coupling member 20a. However, the present invention is not limited to this configuration and, for example, the coupling member 20a may be manually turned. In the above-described embodiment, the configuration has been illustrated where an outside such as a rotating body fixing member 70 or the cylindrical rotating body 10 per se has a power source (battery) for rotating the motor, the control unit, and the communication unit. However, the coupling member 20 may have the battery 16, the control unit 17, and the communication unit 18.

In the above-described embodiment, the configuration has been illustrated where the cylindrical rotating bodies 10 are utilized as wheels, like the carriage shown in FIGS. 4A to 4C. However, the present invention is not limited to this configuration and, for example, the exterior bodies 13 of the cylindrical rotating bodies 10 may be coupled to wheels so that the rotating body aggregate 1 rotates and travels by rotating such wheels.

Further, in addition to the above-described embodiment, the cylindrical rotating body 10 or the rotating body aggregate 1, by attaching an accessory (attachment) different from the coupling member 20 thereto, can be utilized for various purposes. For example, a rope that can be wound up by rotation of a cylindrical rotating body 10 may be attached to the cylindrical rotating body 10. The cylindrical rotating body 10 can thus be utilized as a winch. The cylindrical rotating body 10, by attaching a suction port and a suction mechanism thereto, can also be utilized as a vacuum cleaner that sucks debris and the like. Further, the cylindrical rotating body 10, by attaching a brush to the exterior body 13 thereof, can also be used as a cleaner that blows pressurized air to sweep debris and the like or sucks them. Examples of such an apparatus utilizing the cylindrical rotating body 10 as a cleaner include an apparatus for sweeping dust and the like on a surface of a solar panel by shuttling the cylindrical rotating body 10 having a brush attached thereto on the surface of the solar panel. In this case, the cylindrical rotating body 10, by inputting a program such that the cylindrical rotating body 10 shuttles on the surface of the solar panel every fixed time, can be utilized as a cleaning robot that shuttles on the surface of the solar panel every fixed time for cleaning. The cylindrical rotating body 10, by forming it in a long thin shape, can also be utilized for effectively cleaning a gap between furniture and the like. Additionally, it is also possible to remove lint and dust at once on a carpet or a suit, by attaching a blade 19 to a part of the cylindrical rotating body 10. Additionally, a mechanism for air ejection or water ejection may be attached to the cylindrical rotating body 10. Further, a water absorption (water discharge) mechanism or a snow removing mechanism may be attached to the cylindrical rotating body 10. The cylindrical rotating body 10, by attaching a blade 19 to the exterior body 13 thereof, can also be utilized as an auger (snow shoveling mechanism) of a rotary snowplow.

The cylindrical rotating body 10 to which the blade 19 is attached, by attaching an accessory for holding a rope or a rail thereto, can be utilized also as an apparatus that shovels snow on a roof while moving along the rope or the rail. Further, the cylindrical rotating body 10, by increasing the size and the weight thereof, can also be utilized as a road roller. FIG. 33 is a bottom view showing a configuration example in the case where the cylindrical rotating bodies 10 are utilized as a road roller 74. The illustrated road roller 74 includes a first row made up of three cylindrical rotating bodies 10i, a second row of roller group made up of two cylindrical rotating bodies 10i, and roller coupling frames 75 coupling the first row of roller group and the second row of roller group together. The second row of roller group is arranged in a zigzag manner such that the cylindrical rotating bodies 10i are located at positions overlapping with coupling members 20i of the first row of roller group. The numbers of the cylindrical rotating bodies 10i constituting the first row of roller group and the second row of roller group are not limited to the numbers as illustrated, and the number of roller groups may be three or more.

The cylindrical rotating body 10, by attaching a sponge to the exterior body 13 thereof, can also be utilized as a painting apparatus. The cylindrical rotating body 10, by attaching crushing protrusions to the exterior body 13 thereof, can also be utilized as a roller of a grinding machine. Further, the cylindrical rotating body 10, by attaching a useful tool for digging or agriculture to one end thereof, can also be utilized as a digging machine, a cultivating machine, or agricultural equipment that performs digging, cultivation, weeding, or the like by rotation of the cylindrical rotating body 10.

The cylindrical rotating body 10, depending on an accessory attached to a fore end thereof, allows for trimming, brushing, massage, or the like on an animal. Additionally, the cylindrical rotating body 10 can also be utilized as a motorized tool by attaching a tool such as a turnscrew, a driver, a ratchet, a wrench, a spanner, a trimmer, a chainsaw, a cutter, a drill, or a power saw to the cylindrical rotating body 10. The cylindrical rotating body 10 can also be utilized with a cooking device attached thereto. For example, the cylindrical rotating body 10, by attaching an agitating vane thereto, can also be utilized as an agitating machine, and the cylindrical rotating body 10, by attaching a blade thereto, can also be utilized as a mixer. Note that these configurations can be achieved using publicly known technique (hereinafter the same). The above-described accessories each include a coupling section capable of coupling to the second coupling section 15 of the cylindrical rotating body 10 as in the coupling member 20 (hereinafter the same).

Additionally, in the first embodiment described above, the configuration has been illustrated where the cylindrical rotating bodies 10 are utilized as the wheels of the carriage. However, the present invention is not limited to this configuration and, for example, the cylindrical rotating bodies 10 may be utilized as wheels of a moving body that carries a person or a thing. For example, the cylindrical rotating bodies 10, by attaching them to a ground-contacting portion of a litter or a stretcher, can constitute a mobile litter or a mobile stretcher. The cylindrical rotating bodies 10, by attaching them to a ground-contacting portion of a care bed, can constitute a mobile care bed. Further, there can also be provided, by attaching the cylindrical rotating bodies 10 to an upper surface of a care bed, a care bed having a function of massaging a patient who is unable to roll over. Further, a plurality of the cylindrical rotating bodies 10, by attaching brushes thereto and assembling them, can also be utilized as a collapsible car-washing machine.

In the seventh embodiment described above, as shown in FIG. 12, the moving apparatus 72 having the plurality of cylindrical rotating bodies 10 coupled together via the coupling members 20b in the width direction has been illustrated. However, in addition to this configuration, endless track (or chain) may be attached to the rotating body aggregate 1c. The rotating body aggregate 1c can thus rotate and travel comparatively easily even on an irregular road and, for example, also be utilized as a robot for disaster. In the fifth embodiment described above, the rotating body aggregate 1b has been illustrated with the plurality of cylindrical rotating bodies 10 coupled together in the length direction in which the coupling member 20a can rotate. However, in addition to this configuration, the rotating body aggregate 1b can also be utilized as a snake-shaped robot for disaster. For example, such a snake-shaped robot for disaster is movable by controlling the coupling member 20a so that the whole body is wriggled and controlling rotation of the cylindrical rotating bodies 10, and can also be used for check in a pipe by attaching a camera or a sensor to the cylindrical rotating body 10.

Additionally, in the eighth and ninth embodiments described above, the configurations have been illustrated where the cylindrical rotating body 10 or the rotating body aggregate 1 is utilized as agricultural equipment or a constituent element thereof. However, for example, the cylindrical rotating body 10 or the rotating body aggregate 1 can be utilized for spraying disinfectant or agrochemicals by attaching a mechanism for spraying disinfectant or agrochemicals to the cylindrical rotating body 10. In this case, controlling a motion (timing of spraying agrochemicals) of the cylindrical rotating body 10 such that spraying is performed only in one direction can prevent from spraying agrochemicals to an unexpected place. The cylindrical rotating body 10, by attaching an air generation mechanism thereto, may be configured to spray agrochemicals in a specified direction. The cylindrical rotating body 10 or the rotating body aggregate 1 may be attached to a finger part of a glove wearable by a person. This enables an operator to pull out grass from the ground by gripping the grass and rotating the cylindrical rotating body 10, or to pluck off a fruit or a vegetable by gripping the fruit or the vegetable and rotating the cylindrical rotating body 10. Further, in the realm of forestry, it is possible to loop the rotating body aggregate 1 to attach it to a trunk of a tree, further attach blades 19 to the cylindrical rotating bodies 10, and cause the cylindrical rotating bodies 10 to rotate and travel (go up and down) along the tree, which results in cutting off (prune) branches from the tree or barking the tree and processing the tree as a wood. The rotating body aggregates 1 constituted by the cylindrical rotating bodies 10 to which the blade 19 is attached may be coupled together in a length direction to form into a snake shape, which allows the rotating body aggregates 1 to also operate so as to creep up a tree and thus perform pruning. Additionally, the cylindrical rotating body 10, by attaching a camera and a speaker or a light source thereto, can also be utilized for a crime prevention device or repelling harmful animals. Note that a robot hand to which the above-described cylindrical rotating body 10 is attached can also perform wood-processing or pruning.

Further, in addition to the above-described embodiments, the cylindrical rotating bodies 10 or the rotating body aggregates 1 may be attached to bottom parts of shoes wearable by a person. This enables a person to move without walking. When the rotating body aggregates 1 are attached to the bottom parts of the shoes, it is preferable that a control unit controls braking of each of the cylindrical rotating bodies 10 to prevent the person from falling.

In addition to the above-described embodiments, a moving apparatus may be constituted by attaching the cylindrical rotating body 10 or the rotating body aggregate 1 to a moving body such as Segway, a drone, or the like. For example, the cylindrical rotating bodies 10 or the rotating body aggregates 1 can also be utilized instead of wheels of Segway or in addition to the vehicle of Segway. When attached to a drone, the cylindrical rotating body 10, by adding a weeding function, a harvest function, a watering function, or the like thereto, can provide agricultural support from the air even in a poor footing environment. The cylindrical rotating body 10 or the rotating body aggregate 1 can also be utilized instead of a vehicle of a weeding machine, a farming machine, an agricultural machine, a cleaner, an industrial robot, and the like.

Further, the cylindrical rotating body 10 or the rotating body aggregate 1 can also be utilized as a medical device. For example, the cylindrical rotating body 10, by downsizing it and attaching a blade 19 or an edge 103 for medical use thereto, can be used as a medical knife. The cylindrical rotating body 10, by enabling emission of a laser beam from a portion thereof, can be utilized as a laser knife. In this case, rotation of the cylindrical rotating body 10 enables 360° emission of a laser beam toward any position. The cylindrical rotating body 10, by attaching it to a fore end of a pole-shaped member and rotating it, can be utilized also for applying medicine to a back, for example. Additionally, the cylindrical rotating body 10 or the rotating body aggregate 1 can also be utilized as a beauty device. For example, the cylindrical rotating body 10, by attaching a blade 19 thereto, can also be utilized as a shaver. As shown in FIG. 12, it is also possible to shave a beard and sideburns at once by attaching respective blades for the beard, the sideburns, or the like to a plurality of the cylindrical rotating bodies 10. Further, there can also be provided, by configuring a rotating body aggregate such that a whole face from a nose is surrounded using a plurality of the cylindrical rotating bodies 10, a shaver capable of shaving beards on a whole face at once. In this way, for example, a caregiver can easily shave a beard of a person who requires care. The cylindrical rotating body 10 can be utilized not only for a shaver but also for cutting hair of a head, and removing an agnail. The cylindrical rotating body 10, by constituting it without a blade, can also be utilized for massaging a face and a body.

Further, the cylindrical rotating body 10 can also be utilized for makeup and skin care. When utilized for face massage, makeup, and skin care, the rotating body aggregate, by configuring it such that a whole face is surrounded, can massage a whole face at once. Further, the cylindrical rotating body 10, by embedding it into a pillow, can also be utilized as a head massager.

Additionally, in the third embodiment described above, the configuration has been illustrated where the cylindrical rotating bodies 10 or the rotating body aggregates 1 are utilized as an intellectual toy through programming motions thereof. In addition to this configuration, the rotating body aggregate 1 can also be used as a toy for plate spinning with a plate or a member corresponding thereto on one end of the rotating body aggregate 1. It is thus possible to compete on the number of coupled cylindrical rotating bodies 10 that have succeeded in plate spinning. The cylindrical rotating body 10, by configuring it such that water is discharged therefrom, can also be utilized as a device for a performance with water. Further, the rotating body aggregates 1 can also constitute a snake-shaped robot that can be programmed and assembled. The cylindrical rotating bodies 10 can also be utilized as wheels of play equipment such as a roller coaster. Further, the rotating body aggregate 1 can also be utilized for an attraction apparatus such as a chair or a vehicle that vibrates to a movie to vibrate a spectator or a rider.

In addition to the embodiment described above, the cylindrical rotating body 10 smaller in size may be disposed in the cylindrical rotating body 10 larger in size. The cylindrical rotating body 10 can be utilized also in water and in the air. For example, the cylindrical rotating body 10, by attaching a screw thereto, can be utilized as a motor for traveling in water or on water. The cylindrical rotating body 10, by attaching a plurality of blades thereto, can be utilized as a propeller. The cylindrical rotating body 10, depending on an attachment direction thereof (including a horizontal direction and a vertical direction), can be utilized as a motor for horizontally or vertically traveling in water. The cylindrical rotating body 10 may also include a solar panel and be configured to be supplied with power by photovoltaic generation. A plurality of the cylindrical rotating bodies 10 may be sequentially disposed on a road or a transportation path. Rotation of the cylindrical rotating bodies 10 can thus carry a person, a vehicle, and a load like a belt conveyer.

In addition to the embodiment described above, the cylindrical rotating body 10 or the rotating body aggregate 1, by attaching a camera and a speaker thereto, can be utilized as an apparatus for crime prevention. In this case, for example, it is possible to cause the rotating body aggregate 1 to hold a vertically standing pole as in the fifth embodiment, which yields a mobile camera and speaker for crime prevention. The cylindrical rotating body 10 can also be utilized as a self-traveling iron by attaching a heat generation mechanism thereto. Further, the cylindrical rotating body 10 can also be utilized for an internal combustion engine, an engine, and a power generator.

Further, the cylindrical rotating body 10 or the rotating body aggregate 1 can also be utilized with a fishing implement attached thereto. For example, the cylindrical rotating body 10 can be used as a roller of a winch that winds up a rope. The cylindrical rotating body 10 can also be used as a reel to be attached to a fishing rod.

The cylindrical rotating body 10 or the rotating body aggregate 1 may be utilized as a tire (wheel) of a vehicle, caterpillar, or a wheel of a train (or a train-shaped moving body). This train-shaped moving body may be a transportation for containers, and can also travel on a road. In the sixth embodiments described above, the configuration where the cylindrical rotating bodies 10 or the rotating body aggregates 1 are utilized as a robot hand has been illustrated. However, instead of or in addition to this configuration, the cylindrical rotating body 10 or the rotating body aggregate 1 can be utilized for a foot section of a robot. For example, it is possible to make a robot movable by attaching the cylindrical rotating bodies 10 or the rotating body aggregates 1 to bottoms of feet of the robot. In this case, a control unit can control braking of each of the cylindrical rotating bodies 10 to prevent the robot from falling. The number of feet included in the robot is not particularly limited. Further, the cylindrical rotating body 10 may be used as an arm, a trunk section, or a leg section of a robot.

Additionally, the cylindrical rotating bodies 10 constituting the above-described rotating body aggregate 1 do not all have to rotate in the same direction, and each can rotate in an independently controlled direction. Each of the cylindrical rotating bodies 10 can also independently operate regarding rotation speed, presence of rotation, and the like.

Figure 24A:
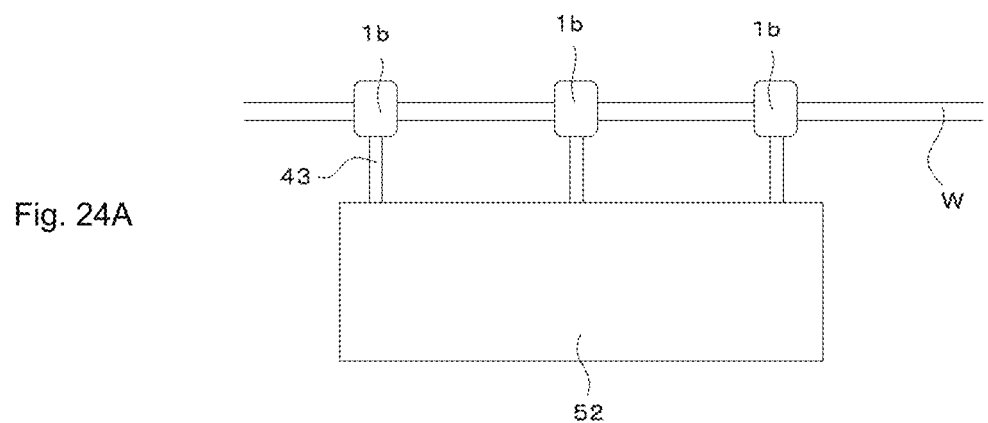
FIG. 24A illustrates a view for explaining a moving apparatus including cylindrical rotating bodies according to a variation of the fifth embodiment.
Figure 24B:
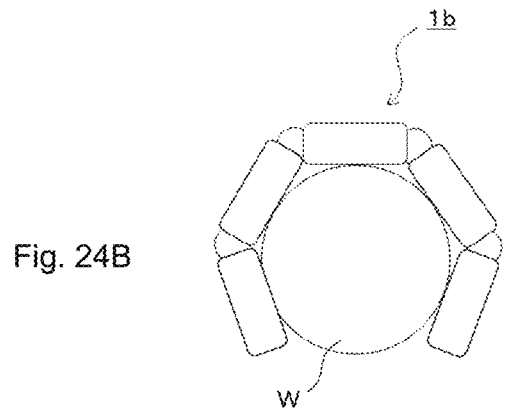
FIG. 24B illustrates a view for explaining a moving apparatus including cylindrical rotating bodies according to a variation of the fifth embodiment.
Figure 24C:
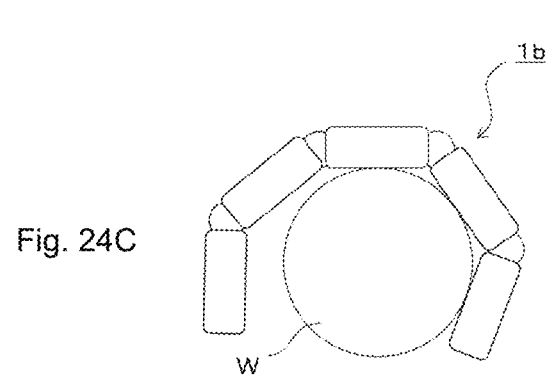
FIG. 24C illustrates a view for explaining a moving apparatus including cylindrical rotating bodies according to a variation of the fifth embodiment.

In the fifth embodiment described above, the rotating body aggregate 1b that holds a rope to rotate and travel on the rope has been illustrated. However, the present invention is not limited to this and, for example, as shown in FIG. 24A, the rotating body aggregate 1b may hold an electric wire W to rotate and travel on the electric wire W. In this case, the rotating body aggregates 1b, by hanging an inspection apparatus 52 including an imaging unit (camera), a processing unit, and a communication unit therefrom, can be utilized as an inspection apparatus for electric wires and the like to inspect an electric wire W or a rail for damaged parts, a rail for obstacles thereon, and the like. A coupling tool 43 coupling the inspection apparatus 52 and the rotating body aggregate 1b together may be fixed in length or may be extendable and contractable. In this case, it is possible, on a portion of the electric wire W other than a joint, to cause the rotating body aggregate 1b to tightly hold the electric wire W as shown in FIG. 24B and, on a joint portion of the electric wire W to which various members are attached, to cause the rotating body aggregate 1b to make a gap between the electric wire W and the rotating body aggregate 1b for avoiding the members as shown in FIG. 24C. It is also possible to cause a rotating body aggregate 1b to separate from the electric wire W, the rotating body aggregate 1b being immediately before the joint portion of the electric wire W out of the plurality of the rotating body aggregates 1b arranged in an advancing direction as shown in FIG. 24A. Note that FIGS. 24B and 24C show a mode where an outer periphery of the electric wire W is not wholly wrapped, but the mode where the outer periphery of the electric wire W is wholly wrapped as shown in FIG. 10B is obviously possible.

FIGS. 24A to 24C illustrate a mode where the electric wire W is held. However, a wire, a rebar, a pole, and the like may be held instead of the electric wire W. For example, instead of the inspection apparatus 52 in FIG. 24A, the mode where a wire is held can be utilized as a zip-line, which is even capable of reverse traveling, by attaching an instrument such as a harness. It is also possible to inspect a road, an electric wire, a rail, a structure, and the like by mounting a laser inspection unit on the inspection apparatus 52 instead of or together with the imaging unit (camera).

In the sixth embodiment described above, the rotating body aggregate 1b that holds a rope R to rotate and travel on the rope R has been illustrated. However, the present invention is not limited to this and, for example, as shown in FIG. 34, a plurality of sets of robot hands 101 vertically or laterally opposed to each other may be disposed on a main body 57 via coupling tools 43. The main body 57 includes a control unit that controls driving of the robot hands 101, a power source, and a wireless notice unit. The main body 57 may be an inspection apparatus or may be a carrying section having a carrying space.

Ropes R may be arranged in parallel not vertically but laterally. The ropes R may be wires, electric wires, or reinforcing bars.

In the eighth embodiment described above, the configuration where the blades 19 are attached to the exterior bodies 13 of the cylindrical rotating bodies 10 has been illustrated. However, in addition to this configuration, the blades 19 may be attached also to a surface of the coupling member 20. It is possible, by thus also equipping the coupling member 20 with a function similar to that of the cylindrical rotating bodies 10, to perform uniform mowing or the like even when the cylindrical rotating bodies 10 are coupled together via the coupling member 20.

Figure 25A:
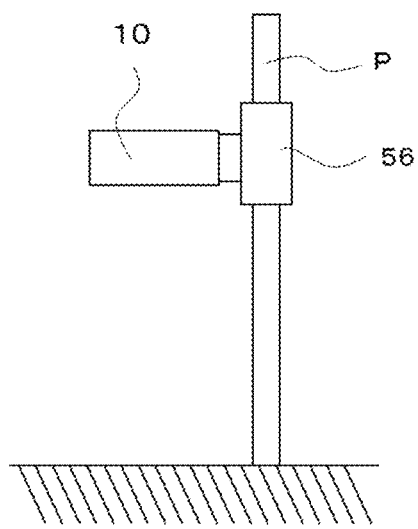
FIG. 25A illustrates a view for explaining moving apparatuses each including a cylindrical rotating body according to a variation of the eighth embodiment.
Figure 25B:
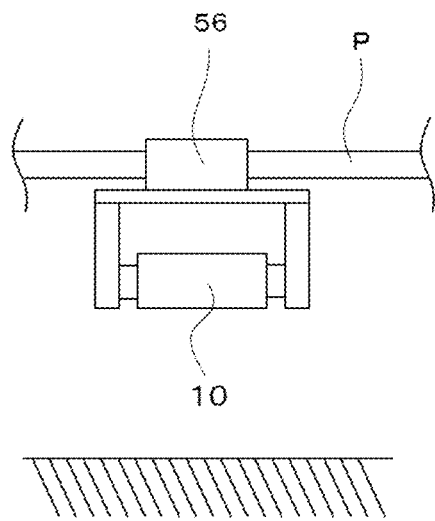
FIG. 25B illustrates a view for explaining moving apparatuses each including a cylindrical rotating body according to a variation of the eighth embodiment.

As shown in FIG. 25A, the cylindrical rotating body 10 can be attached to a vertically standing pole via an attachment. As shown in FIG. 25B, the cylindrical rotating body 10 can also be attached to a pole P horizontally extending away from the ground via an attachment. The attachment 56 is not particularly limited and a publicly known attachment can be utilized. Use of the attachment 56 thus allows the cylindrical rotating body 10 to be attached to any member. Here, a motor of the cylindrical rotating body 10 may be constituted by a hydraulic motor, and a hydraulic pump and a fuel tank for an engine or a hybrid driving source including both an engine and a motor may be disposed in a hollow space. A spraying apparatus (spray) for spraying agrochemicals or the like may be attached to the cylindrical rotating body 10.

In the above-described embodiment, the configuration where the blades 19 are attached to the cylindrical rotating bodies 10 has been illustrated, but the shape of the blades 19 is not particularly limited. For example, a reel-type structure is also possible where a plurality of blades are included like a razor. A rotary-type structure is also possible that enables cutting like a so-called "electric circular saw" by attaching a disk of which outer edge is a blade to an end of the cylindrical rotating body 10 and rotating it. A grinder may be attached to an end of the cylindrical rotating body 10 to be rotated. The cylindrical rotating body 10 may rotate only an edge that is a blade like a chain saw. Further, a structure is also possible that enables the cylindrical rotating body 10 to perform trimming on an animal and the like by attaching a comb having a plurality of comb-like protrusions to the exterior body 13 and rotating it. The cylindrical rotating body 10, by attaching vanes thereto like an electric fan, can also be utilized as a dryer or a blower. When utilized as a dryer, the cylindrical rotating body 10 may be configured to blow hot air. Further, the cylindrical rotating body 10 may also be configured to emit UV light to be utilized as a hand dryer having a sterilization function. The cylindrical rotating body 10, by attaching vanes thereto, can be utilized also for wind power generation and hydraulic power generation. Further, the cylindrical rotating body 10 may include vanes and be configured to blow hot air to be utilized also for a bio-toilet. Additionally, the cylindrical rotating body 10 may also include vanes to be utilized as an agitating machine that agitates water to aerate it in a farm or the like.

Figure 26A:
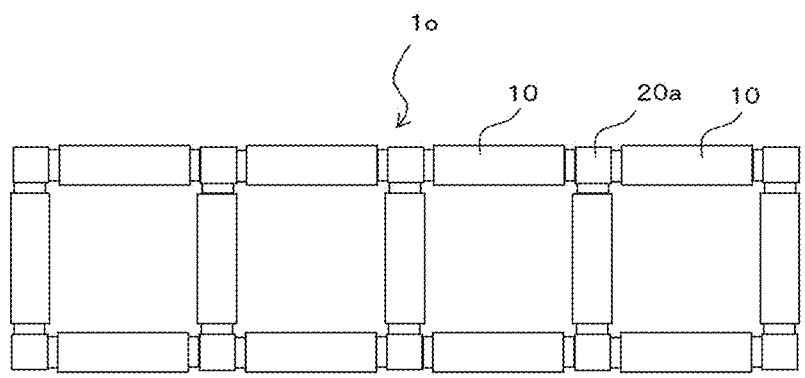
FIG. 26A illustrates a view for explaining a moving apparatus including a rotating body aggregate according to a variation of the fifth embodiment.
Figure 26B:
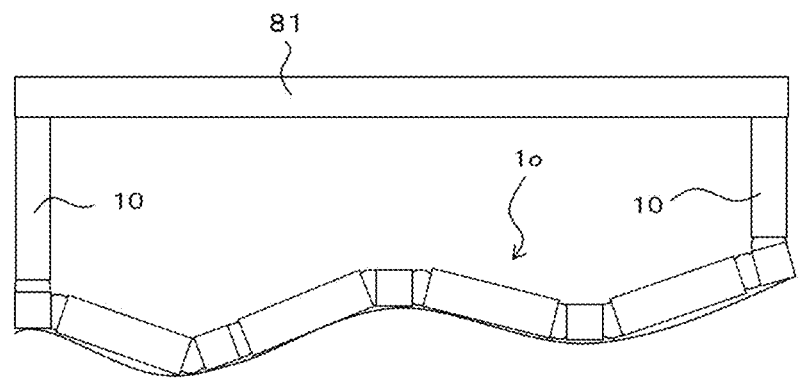
FIG. 26B illustrates a view for explaining a moving apparatus including a rotating body aggregate according to a variation of the fifth embodiment.

In the fifth embodiment described above (FIGS. 8 and 9), the configuration where the cylindrical rotating bodies 10 are coupled together via the coupling member 20a having the shaft 23 has been illustrated. However, in addition to this, for example, as shown in FIG. 26A, a plurality of the cylindrical rotating bodies 10 may be coupled together via the coupling members 20a. Here, FIG. 26B illustrates a configuration where a rotating body aggregate 1o shown in FIG. 26A is attached to a rack section 81 via the cylindrical rotating bodies 10. As shown in FIG. 26B, the rotating body aggregate 1o can rotate and move smoothly on the ground even when the ground is irregular by coupling a plurality of the cylindrical rotating bodies 10 together via the coupling members 20a. In this case, it is also possible to change an advancing direction by varying respective rotation numbers of the cylindrical rotating bodies 10. It can move also on stairs. Especially, in the example shown in FIG. 26B, it is possible to utilizing the cylindrical rotating bodies 10 as vertically extendable supporting poles and control the extension and contraction of the cylindrical rotating bodies 10 to keep the rack section 81 substantially horizontal even when the ground is irregular. Thus, for example, the rotating body aggregate 1o may also be configured to move on an irregular road with a person or a load thereon. For example, the rotating body aggregate 1o can also move with a container or a vehicle (a vehicle to be carried) thereon. Further, it is also possible to smoothly move a stroller, a suitcase, or a wheelchair by replacing wheels of the stroller, the suitcase, or the wheelchair with the rotating body aggregate 1o. Additionally, the rotating body aggregate 1o may include a suspension to further absorb shocks. A plurality of rotating body aggregates 1o can also be coupled together in a longitudinal direction to be utilized.

Further, in the above-described embodiment, the configuration where the cylindrical rotating body 10 has the motor 11, 13 has been illustrated. However, the present invention is not limited to this configuration and, for example, as shown in FIG. 12, when a plurality of the cylindrical rotating bodies 10 are coupled together in a width direction, some of the cylindrical rotating bodies 10 may include no motor 11, 13 and be driven to rotate by the other cylindrical rotating bodies 10 having a motor 11, 13.

The invention claimed is:
1. A moving apparatus comprising:
three or more cylindrical rotating bodies; and
a plurality of coupling members each of which couples two of the cylindrical rotating bodies together such that an angle between the cylindrical rotating bodies is smaller than 180°, wherein
each of the three or more cylindrical rotating bodies comprises:
a motor; and
an exterior body configured to be rotated by the motor, wherein
the three or more cylindrical rotating bodies are configured to form a closed polygonal shape to hold an elongated member, including a rope, whereby the moving apparatus is movable along the elongated member.
2. The moving apparatus according to claim 1, comprising:
a storage section configured to store a control program; and
a controller configured to control a rotation number of the exterior body based on the control program, wherein
a rotation number of each of the exterior bodies of the plurality of cylindrical rotating bodies is controllable.
3. The moving apparatus according to claim 2, wherein the controller is configured to cause the cylindrical rotating bodies to strongly grip the elongated member to apply a brake.

4. The moving apparatus according to claim 1, wherein the cylindrical rotating body comprises an extendable mechanism that allows the cylindrical rotating body to extend and contract in a longitudinal direction.

5. The moving apparatus according to claim 4, wherein the exterior body comprises: first and second exterior bodies each with a helicoid that are disposed in a nested manner; and a motor for extension and contraction of the first and the second exterior bodies, and the exterior body is automatically extendable and contractable in the longitudinal direction by the motor for extension and contraction.

6. The moving apparatus according to claim 1, comprising a locking mechanism configured to lock the polygonal shape.

7. The moving apparatus according to claim 1, wherein the moving apparatus is configured to go up and down along the elongated member obliquely upward or vertically.

8. A robot hand comprising a plurality of fingers constituted by the moving apparatuses according to claim 1.

9. The robot hand according to claim 8, wherein the finger includes a fore end to which a tool, a cooking device, or an electric machine is attachable.

\* \* \* \* \*